United States Patent
Bagheri et al.

(10) Patent No.: US 10,588,161 B2
(45) Date of Patent: Mar. 10, 2020

(54) COLLISION HANDLING BETWEEN STTI AND TTI TRANSMISSIONS

(71) Applicant: Motorola Mobility LLC, Chicago, IL (US)

(72) Inventors: Hossein Bagheri, Urbana, IL (US); Vijay Nangia, Woodridge, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/971,993

(22) Filed: May 4, 2018

(65) Prior Publication Data
US 2019/0045556 A1 Feb. 7, 2019

Related U.S. Application Data

(60) Provisional application No. 62/502,510, filed on May 5, 2017.

(51) Int. Cl.
*H04W 74/08* (2009.01)
*H04W 72/12* (2009.01)
*H04W 74/00* (2009.01)

(52) U.S. Cl.
CPC ... *H04W 74/0858* (2013.01); *H04W 72/1268* (2013.01); *H04W 72/1289* (2013.01); *H04W 74/006* (2013.01); *H04W 74/085* (2013.01); *H04W 72/1278* (2013.01)

(58) Field of Classification Search
CPC ......... H04W 74/0858; H04W 72/1268; H04W 72/1289; H04W 74/006; H04W 74/085
See application file for complete search history.

(56) References Cited

U.S. PATENT DOCUMENTS

| 2007/0201397 A1* | 8/2007 | Zhang | H04L 47/12 370/329 |
| 2009/0141690 A1* | 6/2009 | Fan | H04L 1/0026 370/335 |
| 2011/0280136 A1* | 11/2011 | Wang | H04B 7/2656 370/241 |

(Continued)

OTHER PUBLICATIONS

PCT/US2018/031260, "Notification of Transmittal of the International Search Report and the Written Opinion of the International Searching Authority, or the Declaration", International Searching Authority, dated Aug. 7, 2018, pp. 1-14.

*Primary Examiner* — Chi H Pham
*Assistant Examiner* — Weibin Huang
(74) *Attorney, Agent, or Firm* — Kunzler Bean & Adamson, PC

(57) ABSTRACT

For collision handling between shortened Transmission Time Interval (sTTI) and Transmission Time Interval (TTI) transmissions, a method determines a collision between user equipment (UE) uplink transmission resources in a first TTI 16 of a first TTI length and uplink transmission resources in a second TTI 16 of a second TTI length. The method further transmits a first uplink data transmission block (TB) in the first TTI and a second uplink data TB in the second TTI. The method interrupts the transmission of the first uplink data TB before transmission of the second uplink data TB. The method receives an indication that indicates whether to resume transmission of the first uplink data TB. The method determines to resume the transmission of the first uplink TB based on the indication.

20 Claims, 23 Drawing Sheets

(56) References Cited

U.S. PATENT DOCUMENTS

| | | | |
|---|---|---|---|
| 2012/0020309 A1* | 1/2012 | Malladi | H04W 72/0446 370/329 |
| 2016/0095104 A1* | 3/2016 | Chen | H04L 5/0048 370/329 |
| 2016/0270116 A1* | 9/2016 | Lin | H04W 72/1273 |
| 2017/0332364 A1* | 11/2017 | Sano | H04W 28/16 |

* cited by examiner

Intra-TTI hopping

200

| |
|---|
| Intra-TTI Hopping Value<br>201 |
| Number of Resource Elements<br>203 |
| Target Received Power<br>205 |
| Scaled Downlink Path Loss Estimate<br>207 |
| Adjustment Factor<br>209 |
| Power Control Adjustment States<br>211 |
| Cyclic Shifts<br>213 |
| Orthogonal Cover Codes<br>215 |
| Resumption Policy<br>217 |
| Transmit Power<br>219 |

US 10,588,161 B2

COLLISION HANDLING BETWEEN STTI AND TTI TRANSMISSIONS

CROSS-REFERENCE TO RELATED APPLICATIONS

This application claims priority to U.S. Provisional Patent Application No. 62/502,510 entitled "METHODS OF COLLISION HANDLING BETWEEN STTI and TTI TRANSMISSIONS" and filed on May 5, 2018 for Hossein Bagheri, which is incorporated herein by reference.

FIELD

The subject matter disclosed herein relates to collision handling and more particularly relates to collision handling between shortened Transmission Time Interval (sTTI) and Transmission Time Interval (TTI) transmissions.

BACKGROUND

Description of the Related Art

Long Term Evolution sTTI and TTI transmissions may collide.

BRIEF SUMMARY

A method for collision handling between sTTI and TTI transmissions is disclosed.

The method determines a collision between user equipment (UE) uplink transmission resources in a first TTI of a first TTI length and uplink transmission resources in a second TTI of a second TTI length. The method further transmits a first uplink data transmission block (TB) in the first TTI. The method transmits a second uplink data TB in the second TTI. The method interrupts the transmission of the first uplink data TB before transmission of the second uplink data TB. The method receives an indication that indicates whether to resume transmission of the first uplink data TB after the transmission of the second uplink TB. The method determines to resume or not to resume the transmission of the first uplink TB based on the indication. The method resumes the transmission of the first uplink TB in the first TTI TB after the transmission of the second uplink TB if a UE has determined to resume the transmission of the first uplink TB, wherein the first TTI length is larger than the second TTI length, the first and the second TTI overlap at least in one symbol, the first TTI starts earlier than the second TTI. An apparatus also performs the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
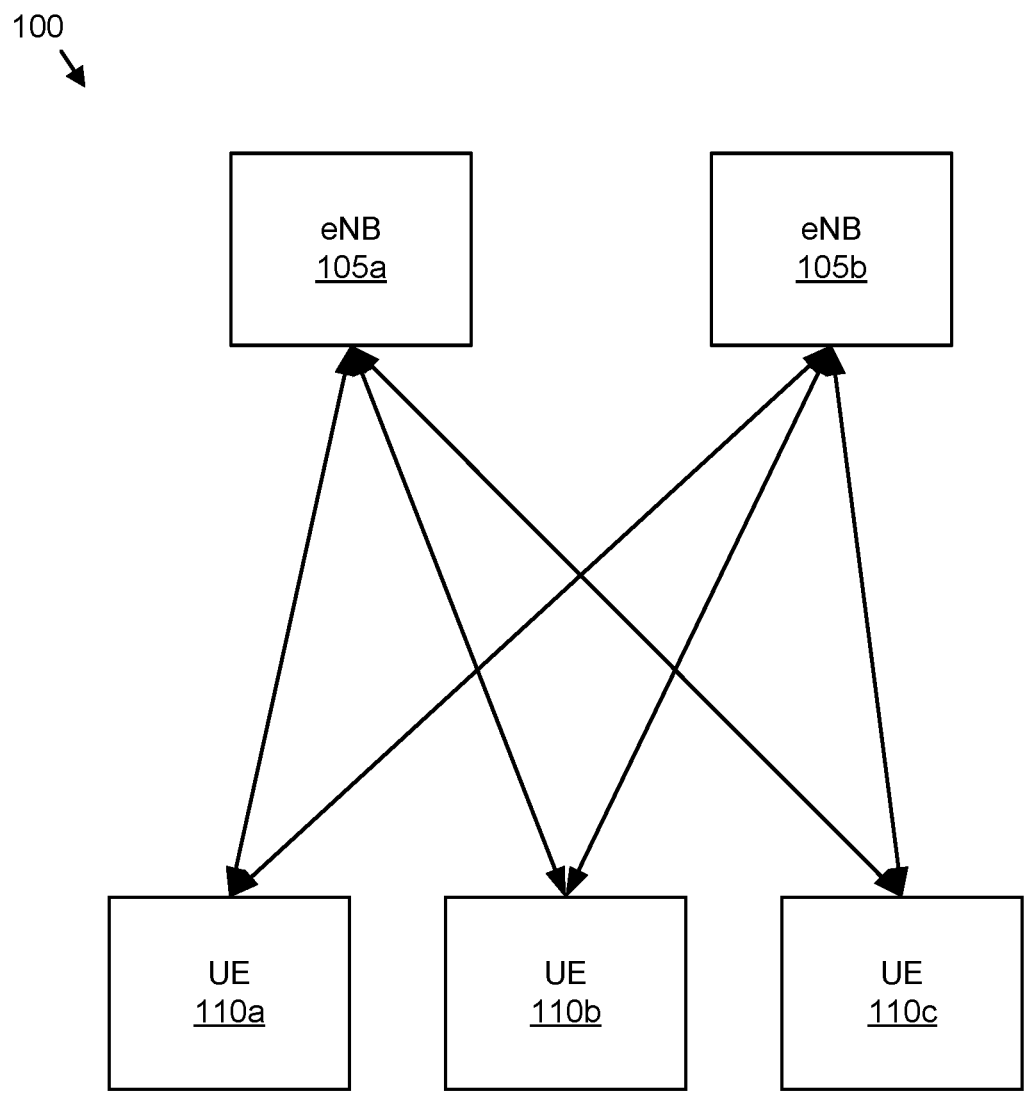
FIG. 1A is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a communication system 100. The system 100 includes one or more evolved node B (eNB) Long Term Evolution (LTE) base stations 105, referred to hereafter as eNB 105 and user equipment (UE) 110. An eNB 105 may communicate with the UE 110. The eNB 105 may be an evolved node B (eNB) Long Term Evolution (LTE) base station. The UE 110 may be a mobile telephone, a machine-type communications (MTC) device, a tablet computer, a laptop computer, and embedded communication devices in automobiles, kiosks, appliances, and the like.

Figure 1B:
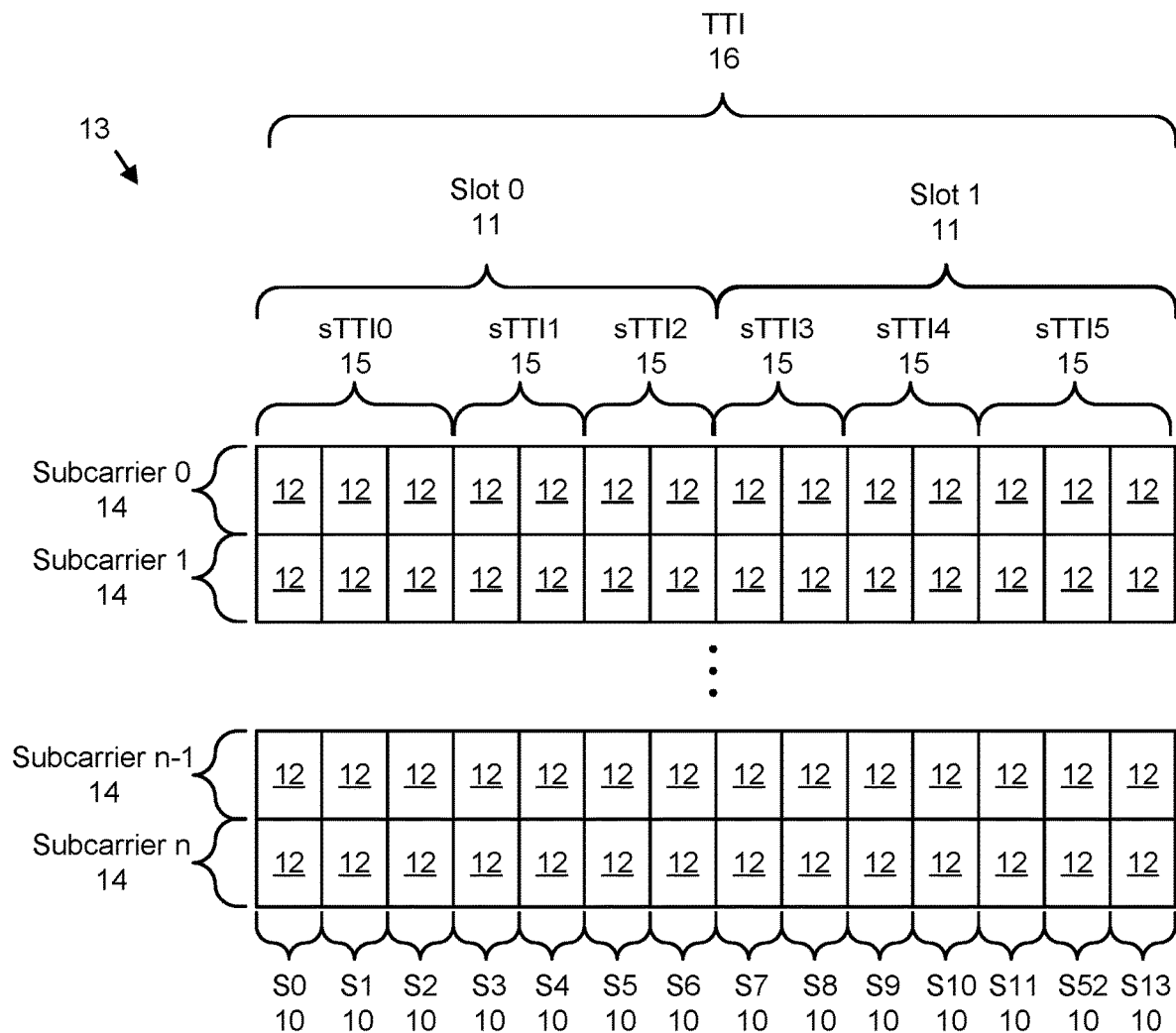
FIG. 1B is a schematic diagram illustrating one embodiment of a subframe 13.

FIG. 1B is a schematic block diagram illustrating one embodiment of a subframe 13. In the depicted embodiment, two slots 11 are shown. Slot 0 11 may be referred to as a first slot 11 and slot 1 11 may be referred to as a second slot 11. In current 3GPP (Third Generation Partnership Project), time-frequency resources are divided into subframes where each 1 ms subframe 13 comprises two 0.5 millisecond (ms) slots 11 and each slot 11 comprises seven SC-FDMA symbols 10 in time domain in uplink (UL) and seven Orthogonal Frequency-Division Multiplexing (OFDM) symbols 10 in time domain in downlink (DL). Each combination of a sub carrier 14 and a symbol 10 forms a resource element 12. In the frequency domain, resource elements 12 within a slot are divided into physical resource blocks (PRB), where each PRB spans contiguous subcarriers. A transmission block (TB) may comprise a plurality of resource elements 12.

In current LTE systems, resources such as resource elements 12 are typically assigned using a 1 ms minimum transmission time interval (TTI) 16 when data is available, referred to as dynamic scheduling. Within each scheduled TTI 16, in UL, the UE 110 transmits data using a TB such as a PUSCH in PRB-pairs indicated by an uplink grant to the UE 110 that schedules the data transmission. In DL, the eNB 105 transmits data over a physical downlink shared channel (PDSCH) in PRB-pairs indicated by a DL grant/assignment. The UL grant and/or DL assignment information is provided to the UE 110 in a control channel, referred to as a (enhanced) physical downlink control channel (E)PDCCH. The (E)PDCCH channel (in subframe n) carries the control information about the DL data being transmitted in the current subframe (subframe n) and the control information about the UL resources which UE 110 need to use for the uplink data transmission in subframe n+k (k>=0).

A UE 110 shall monitor a set of (E)PDCCH candidates for control information, where monitoring implies attempting to decode each of the (E)PDCCH decoding candidates in the set according to the monitored DCI formats. The set of (E)PDCCH candidates to monitor are defined in terms of (E)PDCCH search spaces.

UL DMRS Aspects

Figures 1, 1C:
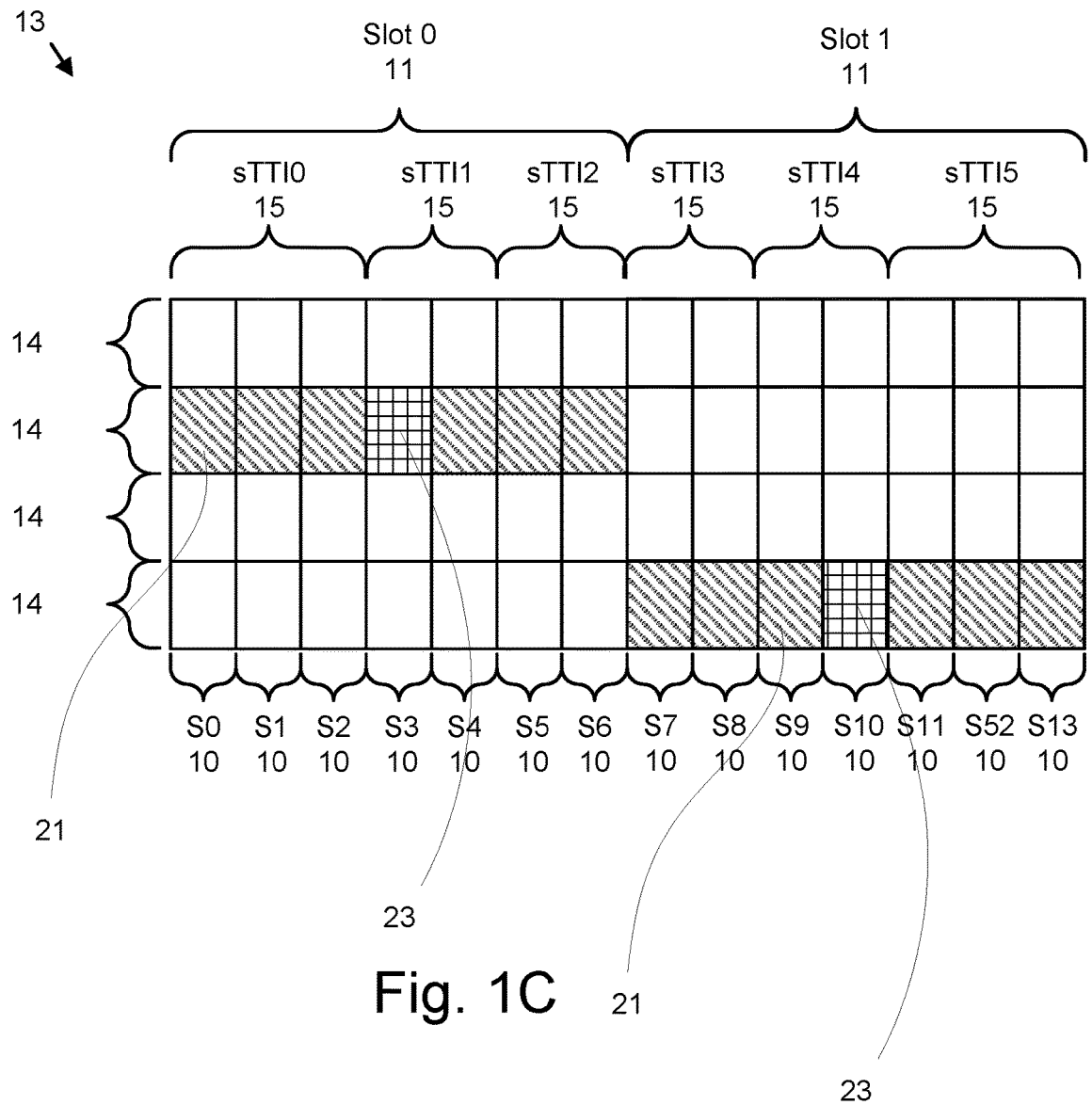
FIG. 1C is a schematic diagram illustrating one embodiment of a subframe.

FIG. 1C shows one embodiment of a subframe 13. In LTE, the UL data and some control information which may be UCI containing acknowledgement/non acknowledgement (A/N), channel quality indicator (CQI), rank indicator (RI), pre-coding matrix indicator (PMI), procedure transaction indicator (PTI), contention resolution identity (CRI) is sent in PUSCH 21. The PUSCH 21 can have DMRS 23 which an eNB 105 can use to demodulate the PUSCH in SC-FDMA symbols 10 as shown. The location of DMRS 23 may be fixed for all UEs 110 in symbols 3 and 10 within the subframe.

A UE 110 receiving an UL grant for PUSCH transmission can be assigned cyclic shifts (CS) and orthogonal cover codes (OCC) for DMRS 23 transmission (multiple CS and OCC pairs for different layers in UL MIMO transmission). The use of CS and OCC helps the eNB 105 to orthogonalize or make separable simultaneous UL DMRS transmissions (from the same UE in different layers, or from multiple UEs) received at the eNB 105. Table 5.5.2.1.1-1 from the LTE 36.211 specification shows the OCC codes and CSs. As shown in Table 5.5.2.1.1-1, the OCC assignment is based on the 3-bit cyclic shift field in the UL DCI, and number of layer transmission (layer $\lambda \in \{0, 1, \ldots, \upsilon-1\}$, where $\upsilon$ is the number of layers) scheduled by UL DCI.

Table 5.5.2.1.1-1 Mapping of Cyclic Shift Field in uplink-related DCI format to $n_{DMRS,\lambda}^{(2)}$ and $[w^{(\lambda)}(0)\ w^{(\lambda)}(1)]$

| Cyclic Shift in Field uplink-related DCI format [3] | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

UL Power Control Aspects

The UE 110 may determine transmit power P for a subframe/TTI as $P=10 \log 10(M_{PUSCH,c}(i)) + P_{O\_PUSCH,c}(j) +$ $\alpha_c(j)PL_c+\Delta_{TF,c}(i)+f_c(i)$, wherein $M_{PUSCH,c}(i)$ is a number of resource blocks, $P_{O\_PUSCH,c}(j)$ is a target received power signaled to the UE over radio resource control (RRC), $\alpha_c(j)PL_c$ is a scaled downlink path loss estimate with $0 \leq \alpha_c(j) \leq 1$ signaled to the UE over the RRC, $\Delta_{TF,c}(i)$ is an adjustment factor, $f_c$ is an ith power control adjustment state and is calculated as one of $f_c(i)=f_c(i-1)+\delta_{PUSCH,c}(i-K_{PUSCH})$ and $f_c(i)=f_c(i)+\delta_{PUSCH,c}(i-K_{PUSCH})$.

Reduced Latency Operation

To reduce latency of communication in LTE, various embodiments may be employed. For example, an approach envisioned for future LTE systems is to use shorter minimum TTI 15, i.e., shorter than 1 ms or 2 slots or 1 subframe TTI/allocation for PUSCH 21 and physical downlink shared channel (PDSCH), in UL/DL. Using a shorter minimum TTI (sTTI) 15 allows the UE 110 to send/receive data using reduced latency when compared to current LTE systems. In addition, acknowledging each (or a group containing few) sTTI(s) 15 leading to faster (compared to using 1 ms TTI 16) acknowledging data can help in some applications such as transmission control protocol (TCP) during slow-start phase for users in good channel conditions. For example, in the TCP slow-start phase for DL communication, the network-UE link capacity for a user in good channel condition can support more data; but the network sends a smaller amount of data because the network is waiting to receive the acknowledgment for the previously sent data due to the TCP slow-start phase. Therefore, faster acknowledgments (e.g., as a result of using shorter TTI length) would enable the network to better utilize the available network-UE link capacity.

For example, scheduling UE transmission over a sTTI length of 0.5 ms (i.e., sPUSCH (shortened PUSCH) scheduled using a PRB spanning a 0.5 ms slot 11 in a 1 ms subframe 13), or scheduling UE transmission over a sTTI length of ~140 us (i.e., PUSCH scheduled using a shortened PRB spanning 2 SC-FDMA symbols 10 within a slot 11 in a subframe 13), would not only reduce time taken to start/finish transmitting a data packet, but also potentially reduce the round trip time for possible hybrid automatic repeat request (HARD) retransmissions related to that data packet.

Figures 1D, 3:
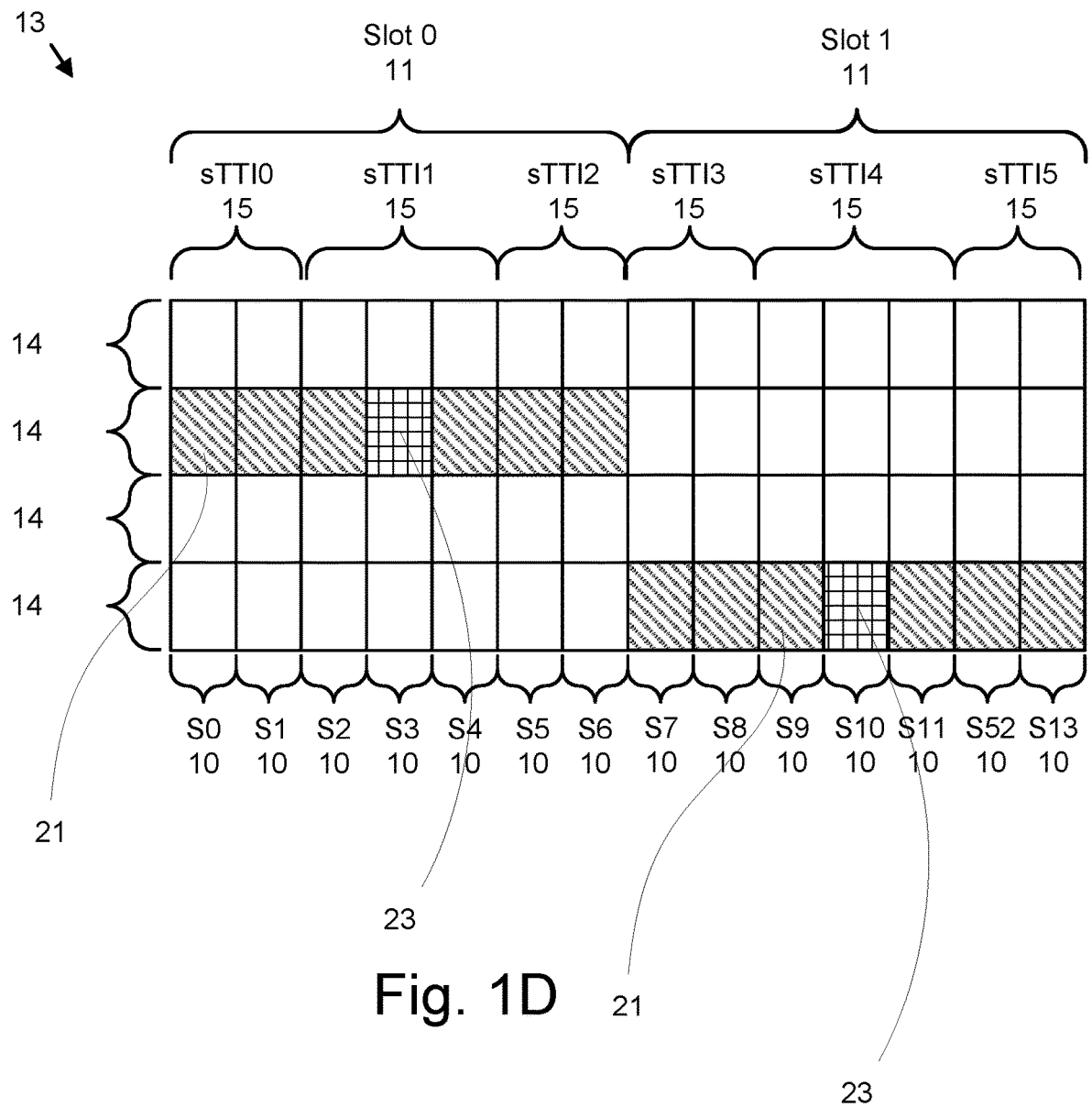
FIG. 1D is a schematic diagram illustrating one alternate embodiment of sTTI pattern of symbols.

FIG. 1D shows an alternate sTTI pattern of symbols 10 per subframe 13 for 2-symbol DL TTI and a CC (component carrier) configured with a 2-symbol sTTI operation, for a cross-carrier scheduled CC, the starting symbol index of the first potential sPDSCH is configured by RRC. For a self-carrier scheduled CC, the starting symbol index of the first potential sPDSCH equals to a control format indicator (CFI) value indicated by a physical control format indicator channel (PCFICH). Table 1 illustrates one embodiment of the UE 110 determining the sTTI pattern.

TABLE 1

| The starting symbol index of the first potential sPDSCH | 2-symbols DL sTTI pattern |
| --- | --- |
| 1, 3 | FIG. 1C |
| 2 | FIG. 1D |

For uplink (UL), for 2/3-OFDM based sTTI 15, the UL sTTI pattern for sPUSCH (i.e., UL data which may carry some UL control information) and sPUCCH (i.e., UL control information) of FIG. 1C may be employed.

A UE 110 may be dynamically scheduled with PUSCH and/or sPUSCH" with a subframe 13 to subframe 13 granularity. For UL transmission, in case of collision between PUSCH and sPUSCH in the same subframe 13 on a given carrier for a UE 110, The UE 110 may transmit sPUSCH. In addition, the UE 110 may stop/drop the transmission of PUSCH with either partial or full stopping/dropping. In one embodiment, the UE 110 may transmit UCI of PUSCH if the PUSCH carries the UCI(s).

Figures 1E, 4:
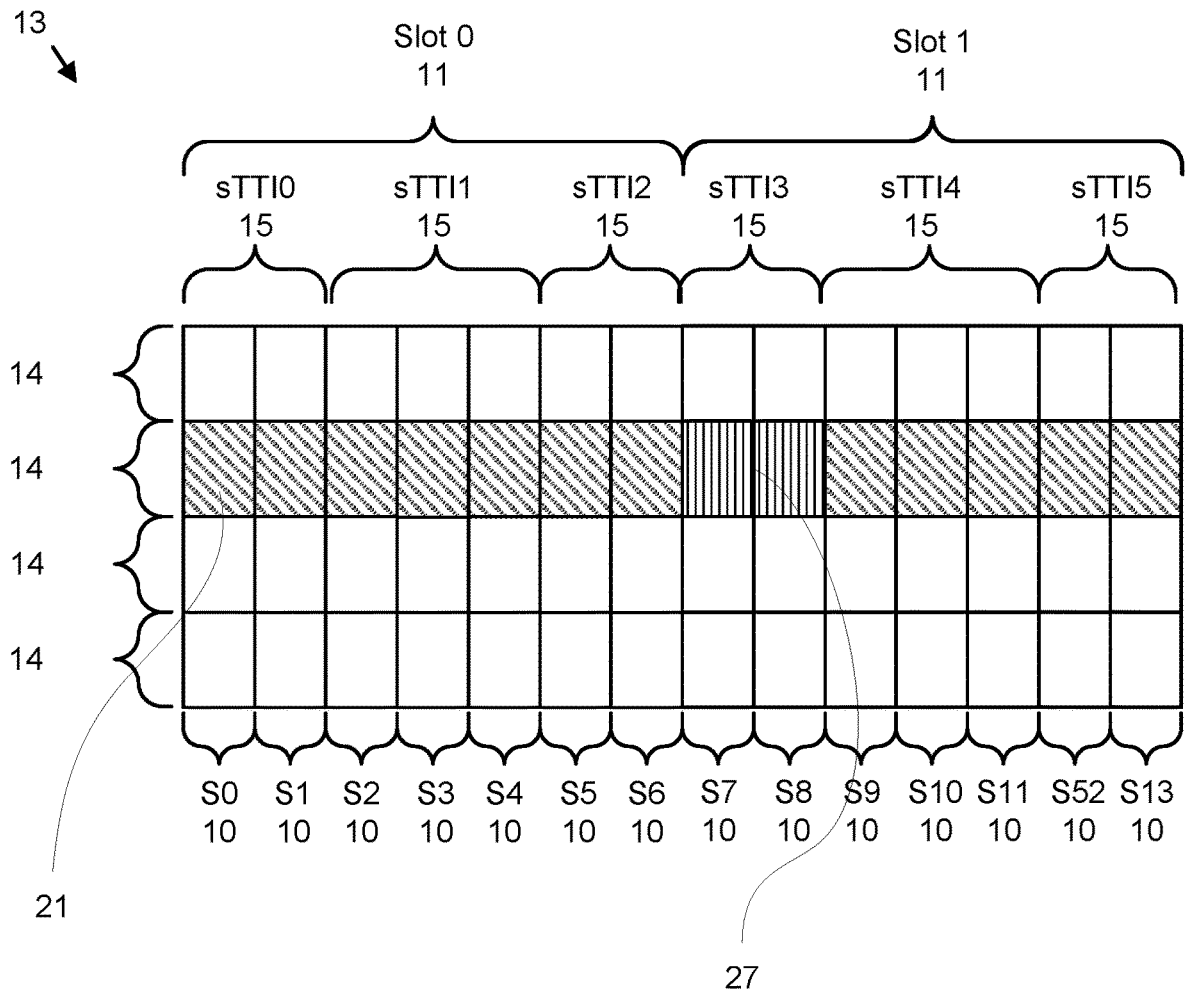
FIG. 1E is a schematic diagram illustrating one embodiment of physical uplink shared channel (PUSCH) resumption.
FIG. 4 is a schematic block diagram illustrating one embodiment of user equipment.

FIG. 1E illustrates one embodiment of PUSCH resumption. When feasible, resuming PUSCH transmission, comprising at least one or more transport blocks (TB) and optionally UCI, after sTTI transmission, wherein interrupted and then resumed PUSCH transmission is referred to hereafter as punctured PUSCH 21, may improve PUSCH 21 decoding performance. The eNB 105 may be able to decode the punctured PUSCH 21 or it may combine the punctured PUSCH 21 with previously received PUSCH 21 for the same TB(s) to decode the PUSCH data. In the depicted embodiment, the UE 110 stops PUSCH transmission at sTTI3 15. The UE 110 further transmits a sTTI related signal such as a sPUSCH 27 containing UL data and/or control, or sPUCCH 27 containing UL control information. Then, after sTTI3 15, the UE 110 resumes the PUSCH transmission.

In LTE, for UL transmission, such as for different UL channels such as PUSCH (physical uplink shared channel) and PUCCH (physical uplink control channel), the transmit power of the UE 110 is controlled by set of mechanisms referred to as UL power control.

Embodiments

The embodiments manage collisions of UL sTTI 15 (e.g., 2 or 3 or 7 symbol TTI) and regular TTI 16 (e.g., 1 ms). In one example, the numerology of the UL sTTI 15 may be different than the numerology for the regular TTI 16. For example, the subcarrier spacing of the UL sTTI 15 may be 60 kHz while the subcarrier spacing of the regular TTI 16 may be 15 KHz. The number of symbols 10 comprising the sTTI 15 may be same with a larger subcarrier spacing for the sTTI 15 compared to the regular TTI 16.

Resuming PUSCH after sTTI Transmission

When feasible, resuming PUSCH transmission after sTTI transmission may improve PUSCH decoding performance. For instance, when a PUSCH DMRS 23 is overlapped with sTTI transmission, there are scenarios where resuming PUSCH transmission in non-overlapping symbols between PUSCH 21 and sTTI 15 may not be helpful, and resuming PUSCH transmission may potentially block resource elements 12 to be scheduled for other sTTI UEs 110 in the remaining of the subframe 13, or may affect PUSCH decoding performance of other potentially paired PUSCH UEs 110 in case of multiuser MIMO (MU-MIMO).

Figures 1F, 5:
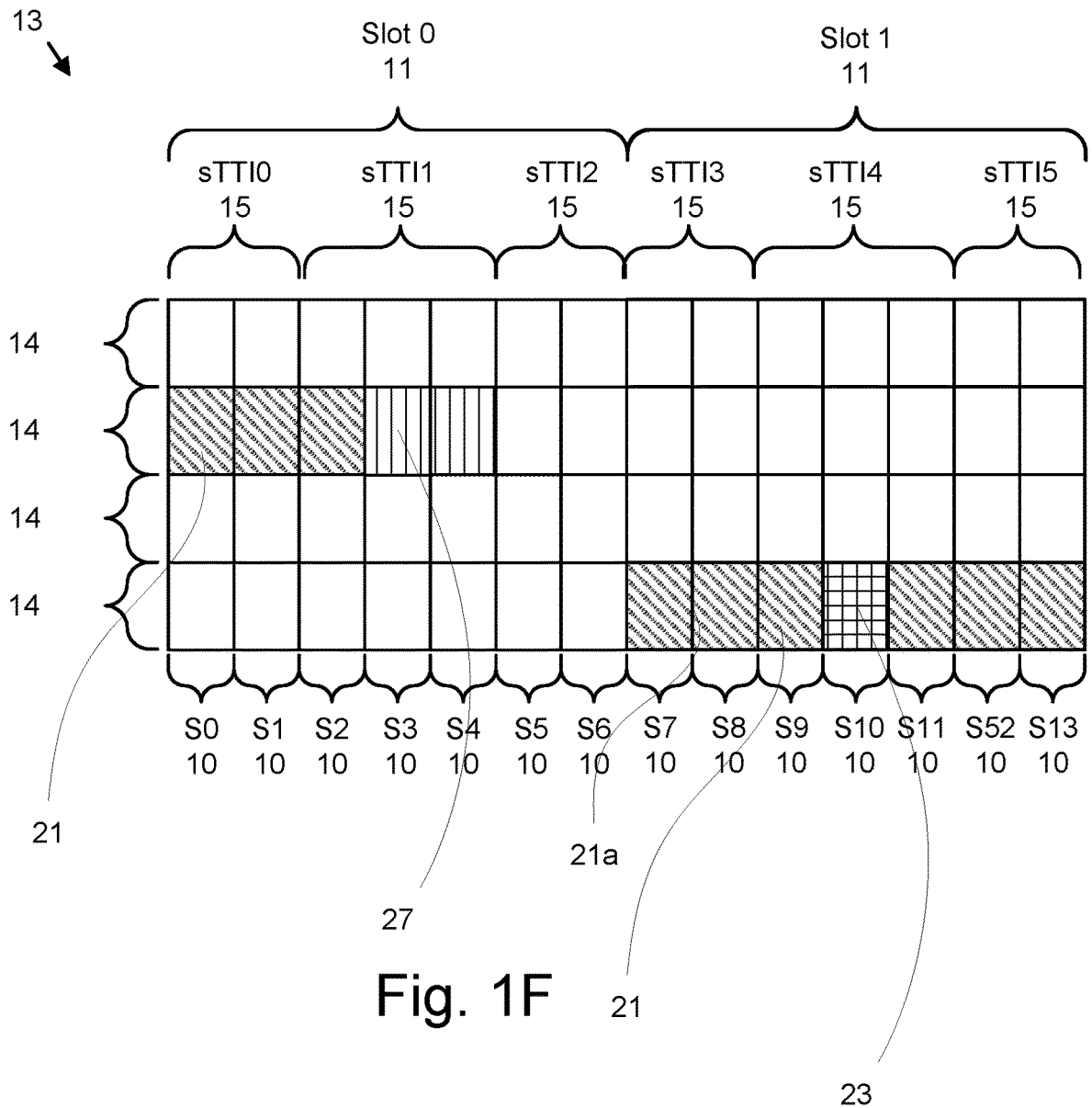
FIG. 1F is a schematic diagram illustrating one embodiment of a PUSCH demodulation reference signal (DMRS) colliding with an sTTI transmission.

FIG. 1F illustrates a PUSCH DMRS 23 in slot 0 11 colliding with an sTTI transmission in sTTI1 15, specifically a sPUSCH 27, when intra-TTI PUSCH hopping is set. In the depicted embodiment, PUSCH transmission may not be beneficially resumed in slot 0 11 (i.e., PUSCH 21a in sTTI2 15) as SC-FDMA symbols 10 cannot be demodulated due to missing the DMRS 23.

Figure 1G:
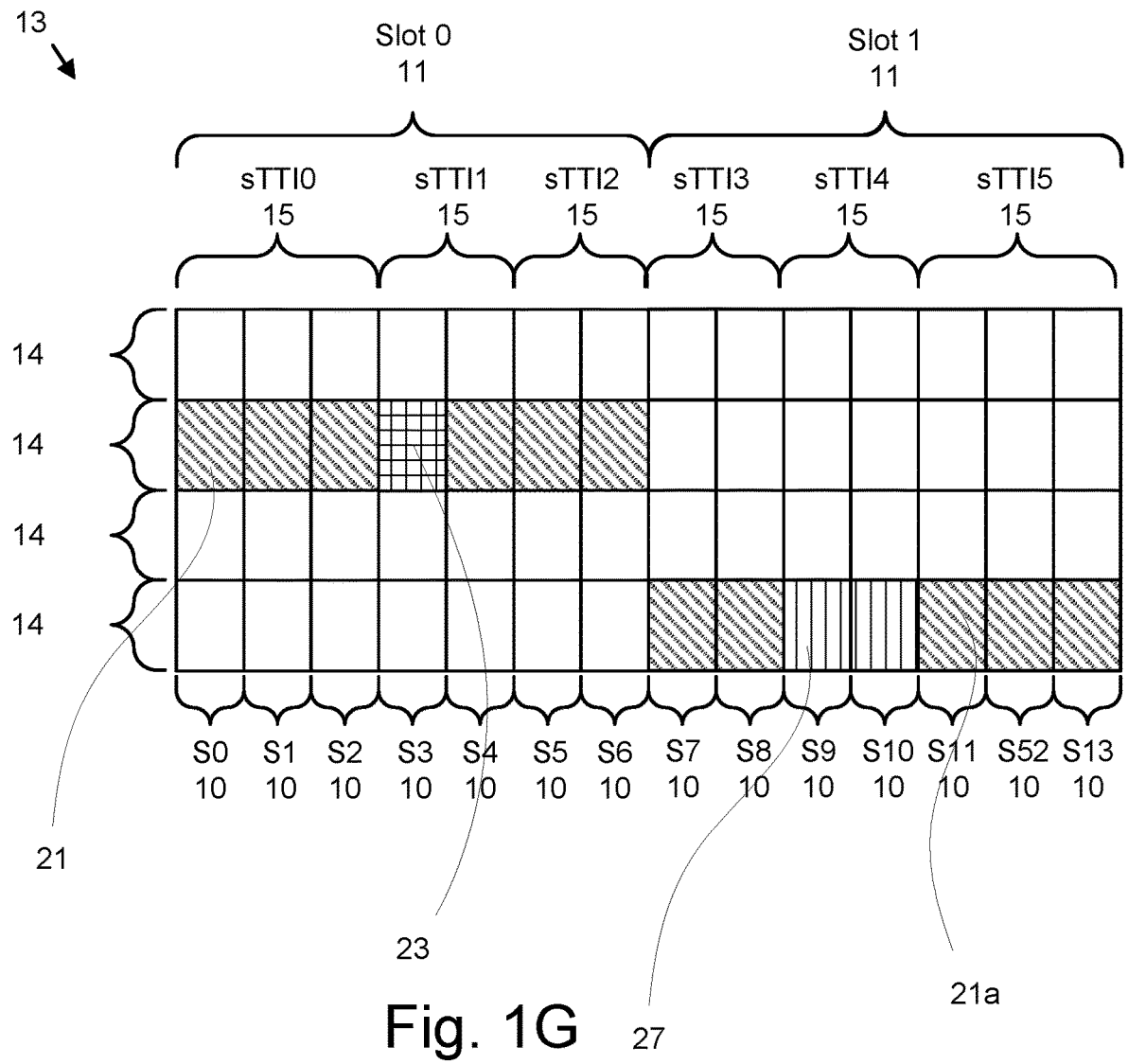
FIG. 1G is a schematic diagram illustrating one embodiment of a PUSCH DMRS colliding with an sTTI transmission.

FIG. 1G illustrates a PUSCH DMRS 23 in slot 1 11 colliding with an sTTI transmission in sTTI1 15, specifically a sPUSCH 27, when intra-TTI PUSCH hopping is set. In the depicted embodiment, PUSCH transmission may not be beneficially resumed in slot 1 11 (i.e., PUSCH 21a in sTTI5 15) as SC-FDMA symbols 10 cannot be demodulated due to missing the DMRS 23.

Figure 1H:
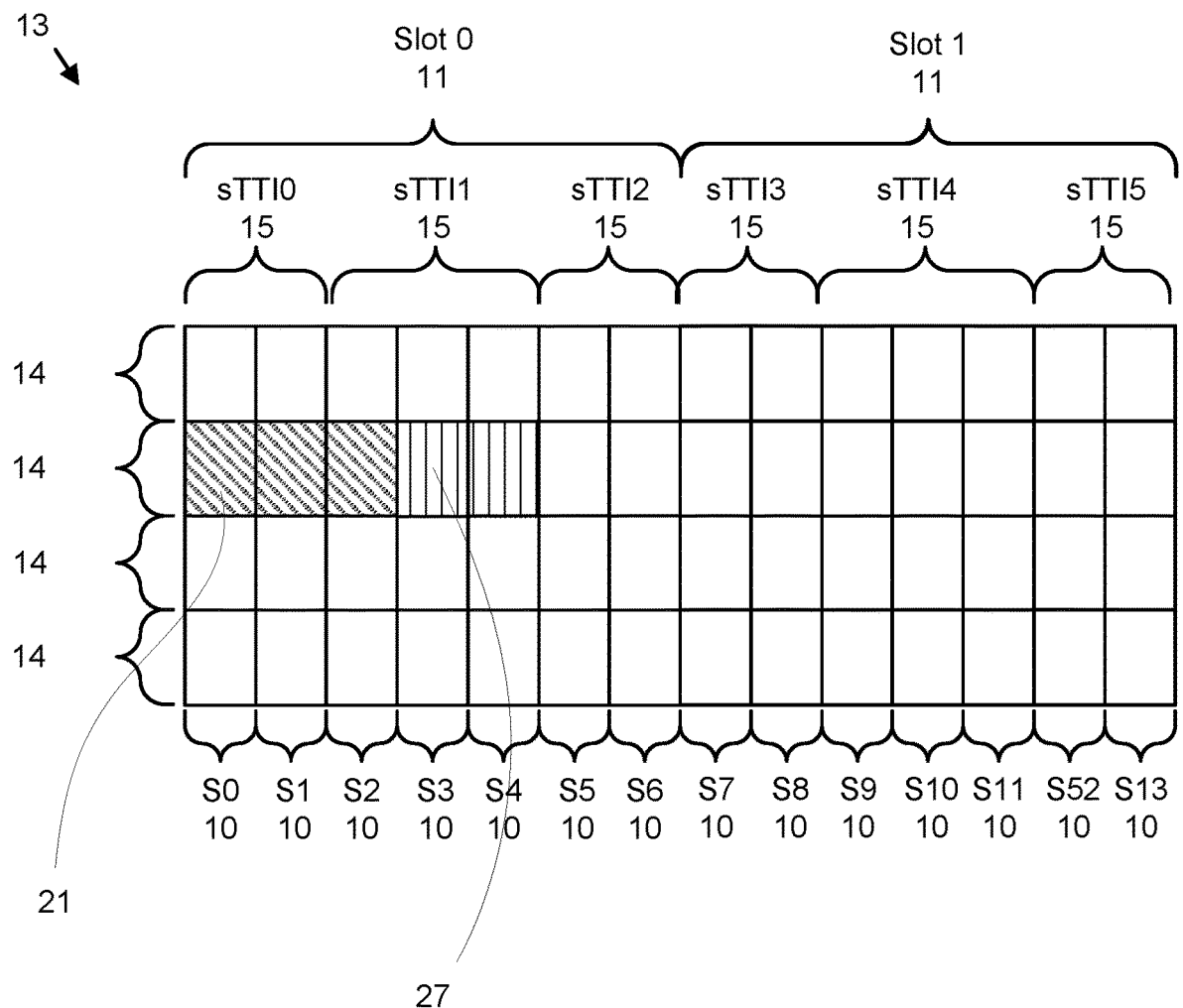
FIG. 1H is a schematic diagram illustrating one embodiment of a PUSCH colliding with an sTTI transmission.

FIG. 1H illustrates a PUSCH 21 colliding with a sTTI transmission, specifically an sPUSCH 27 in slot 0 11. In the depicted embodiment, the PUSCH transmission in slot 0 11 is not useful as intra-TTI hopping is set for PUSCH transmission and PUSCH DMRS 23 is collided with the sTTI transmission. As a result, PUSCH transmission is not resumed in slot 0 11 and also not resumed in slot 1 11. In one example, if intra-TTI hopping PUSCH DMRS 23 is dropped (not set) to transmit sTTI 15 in a slot 11 (e.g., slot 0), PUSCH transmission is resumed at the next slot boundary (e.g., slot 1 as in FIG. 1F).

In another example, the UE may be configured by higher layers (layers above physical layer) on whether to resume the PUSCH transmission in case of collision with sTTI 15. In some embodiments, the configuration may apply to any collision of PUSCH 21 and sTTI 15. In other embodiments, the configuration may apply to only in case of collision of PUSCH DMRS 23 and sTTI 15. In other embodiments, the UE 110 may be configured with separate configurations for case of intra-TTI hopping and no intra-TTI hopping.

In another example, if the UE 110 is configured to resume PUSCH 21, the UE 21 may resume PUSCH transmission in next slot 11, in case of collision between intra-TTI hopping PUSCH DMRS and sTTI for a UE. An example of UE 110 configured to not resume PUSCH transmission after collision with sTTI 15 is shown in FIG. 1H.

In case of uplink subframe bundling with PUSCH transmission spanning multiple subframes 13 for a UE 110, in one embodiment for a collision of PUSCH 21 and sTTI 15 in a first subframe 13, the UE 110 may drop the remaining PUSCH transmission in the subframe 13 as shown in FIG. 1H, and resume PUSCH transmission in a second subframe 13 within the allocated multiple subframes 13. The second subframe 13 may be the next subframe 13 after the first subframe 13. In one example the collision of PUSCH 21 and sTTI 15 correspond to the collision of PUSCH DMRS 23 and sTTI 15.

In another embodiment for uplink subframe bundling and intra-TTI hopping, the UE 110 may resume PUSCH transmission in a next slot 13 within the allocated slots 13 for a collision between intra-TTI hopping PUSCH DMRS 21 and sTTI 15 for a UE 110.

In embodiment, the UE 110 may be assigned a one of the DMRS OCC code (i.e., [1 1] or [1 −1] refer to Table 5.5.2.1.1-1 from 36.211), resuming its PUSCH transmission after sTTI transmission can cause PUSCH performance degradation due to multiuser (MU) interference if another PUSCH UE has been paired with the UE 110 with partially overlapped frequency resources in the subframe using the other DMRS OCC code. This is due to the loss of OCC orthogonality and inter-UE MU interference on the reference signals of the paired UEs 110.

Figure 2A:
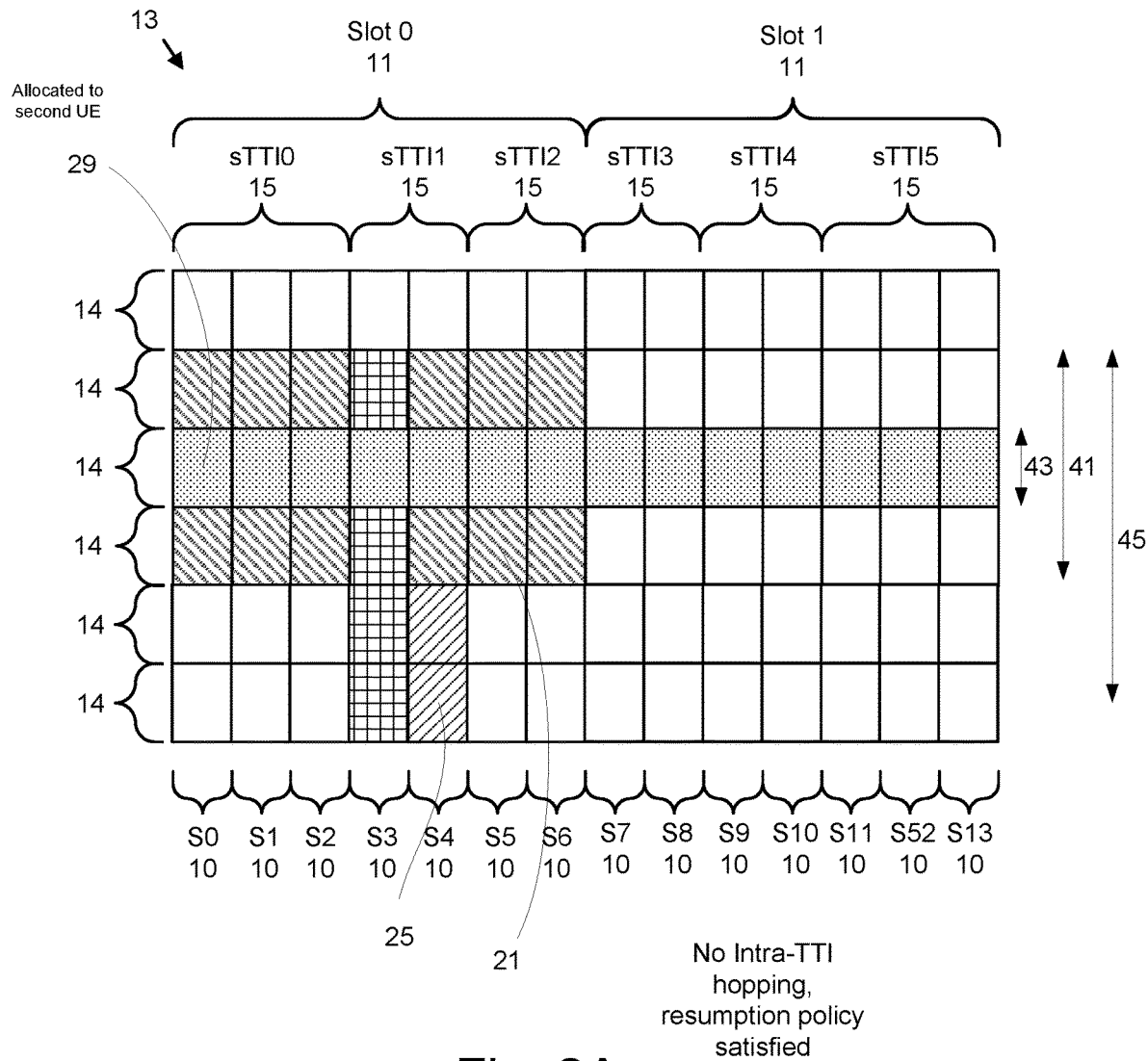
FIG. 2A is a schematic diagram illustrating one embodiment of a PUSCH DMRS colliding with an sTTI transmission.

For example, if the first UE 110 and the second UE 110 have been paired for multiuser multiple-input multiple-output (MU-MIMO) UL transmission as shown in FIG. 2A, due to DMRS dropping in the slot0 by UE1, DMRS separation between UE1 and UE2 via OCC is not possible, so it is better to have UE1 stop PUSCH transmission for the subframe after transmitting sTTI in sTTI1.

FIG. 2A illustrates one embodiment of a PUSCH DMRS 23 of a UE 110 in slot 0 13 colliding with sTTI transmission in sTTI1 15. In the depicted embodiment, a first UE 110 and a second UE 110 are paired for MU-MIMO PUSCH transmissions in the subframe 13. The first UE 110 may be allocated RBs #10-30 41 and the second UE 110 may be allocated RBs #18-24 43. The first UE 110 may be scheduled for sPUSCH transmission in sTTI1 15 over RBs #10-40 45. The first UE 110 may be assigned CS field value=011 with rank1 (hence OCC=[1 1] for single layer) for PUSCH, and the second UE 110 may be assigned CS field value=010 (hence OCC=[1 −1] for both layer 0 and layer 1) with rank2.

Since the first UE 110 does not transmit PUSCH DMRS in symbol 3 10 in the subframe 13 due to an sTTI transmission in sTTI1 15, if the first UE 110 resumes transmitting PUSCH after sTTI1 15, the eNB 105 may not be able to separate the DMRS 23 of the first and second UE 110 and reliably decode PUSCH 21 for the first and second UE 110, since the DMRS 23 should have been separated by OCC codes, but the separation is not possible due to absence of DMRS transmission in symbol 3 10 by the first UE 110. So, the first UE 110 does not transmit PUSCH 21 after transmitting sPUSCH 27.

However, if the eNB 110 does not perform MU-pairing or only pairs UEs 110 with the same resource allocation, and different DMRS cyclic shifts resuming PUSCH 21 is beneficial. Considering that any MU-MIMO is transparent to the UE 110 and resuming PUSCH transmission is beneficial provided that any intra-cell MU interference can be sufficiently suppressed, it may be beneficial to give the eNB 105 the flexibility to enable/disable resuming PUSCH 21 after sTTI transmission depending on whether and how MU-MIMO is supported in the cell. In one embodiment, the eNB 105 may configure a UE 110 to resume or drop PUSCH transmission after sTTI transmission. In another embodiment, the eNB 105 may configure a UE 110 to resume or drop non-intra TTI hopping PUSCH transmission (after sTTI transmission) in case of collision between PUSCH DMRS 23 and sTTI 15.

Such enabling/disabling of resuming PUSCH transmission is possible by higher layer signaling such as RRC, medium access control (MAC) control element (CE), or by physical layer signaling such as enhanced physical downlink control channel (E)PDCCH or shortened physical downlink control channel (sPDCCH) earlier (e.g., in a previous sTTI 15 or subframe 13).

In one example, if a UE 110 is assigned both the OCC codes (e.g., corresponding to rank more than 2, transmission rank 3, 4 in Table 5.5.2.1.1-1 for CS field value of 000), then the UE 110 may resume PUSCH transmission after sTTI transmission in case of collision between sTTI 15 and PUCSH 21. The collision may be between the PUSCH DMRS 23 and sTTI 15 in which case the other DMRS 23 is separable due to use of different cyclic shifts. In one example, the resumption of PUSCH transmission after sTTI transmission is based on the rank of the PUSCH transmission. For example, resume if rank>2, and don't resume otherwise. In another example, the resumption of PUSCH transmission after sTTI transmission is based on the rank of the PUSCH transmission and DM-RS cyclic shift combinations. In other example, the resumption of PUSCH transmission after sTTI transmission is based on the value of the cyclic shift field, for example for a first set of cyclic shift field values resume PUSCH transmission, while for another set of cyclic shift values drop or do not resume the PUSCH transmission.

PUSCH and sTTI Collision from System Perspective

If a UE 110 is scheduled for PUSCH transmission in subframe "n," another UE 110 may not be scheduled for sTTI transmission in that subframe 13 in overlapping resources due to time difference in regular TTI 16 and sTTI 15 scheduling timeline, otherwise will result in introduction of intra-cell MU interference. The eNB 105 may schedule regular TTI and sTTI UEs 110 in non-overlapping resources.

In addition, another UE 110 may be scheduled for sTTI transmission in that subframe 13 in overlapping resources if the eNB receiver can deal with the MU interference due to resource overlap e.g., via detecting high interference on PUSCH symbols (assuming no sTTI collision on PUSCH DMRS), MU interference suppression on the overlapped PUSCH symbols, and/or weighting the LLRs accordingly (assuming no sTTI collision on PUSCH DMRS for reliable channel estimates).

Overlapped PUSCH UCI Handling

Figure 2B:
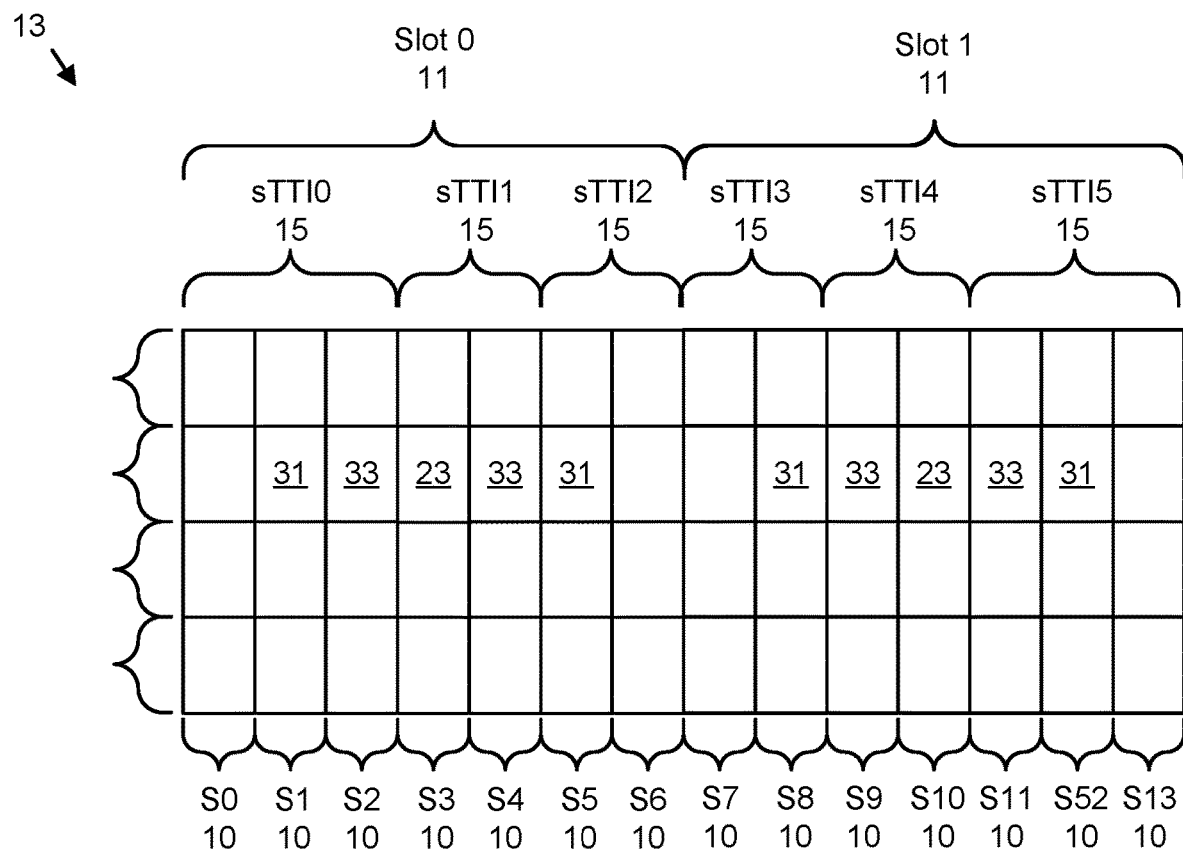
FIG. 2B is a schematic diagram illustrating one embodiment of uplink control information (UCI) mapping.

FIG. 2B illustrates one embodiment of UCI mapping. RI 31, A/N 33, and DMRS 23 are shown allocated to symbols 10. In one embodiment, PUSCH 21 may be stopped/dropped for a UE 110 if PUSCH 21 and sPUSCH 27 are overlapped within a subframe 13. The UCI which was supposed to be carried on PUSCH 21 may be mapped onto sPUSCH 27, at least for sPDSCH HARQ-A/N 33 and/or RI 31.

For the A/N 33 and RI 31 mapping on PUSCH 21, if some of the SC-FDMA symbols 10 containing A/N are not collided with by a sTTI transmission, the SC-FDMA symbols 10 can be used to minimize resources needed on sPUSCH 27 to carry PUSCH UCI. For instance, if sTTI transmission occurs only in sTTI5 15, and PUSCH 21 has been transmitted in the subframe 13 up to sTTI5 15, the number of PDSCH A/N REs 12 required on sPUSCH 27 may be smaller than that of the case where the PUSCH 21 had been dropped completely from the beginning or than the case when the PDSCH A/N REs on sPUSCH 27 are dimensioned ignoring the A/N transmission that have occurred on PUSCH 21. In one example, for a PDSCH ACK/NACK payload (or number of REs 12 needed) on sPUSCH referred to as "X5."

In another example, if sTTI transmission occurs only in sTTI4 15, and PUSCH 21 has been transmitted in the subframe 13 up to sTTI4 15, the number of A/N REs 12 on sPUSCH 27 can be smaller than that of the case where the PUSCH 21 had been dropped completely from the beginning and/or than the case when the PDSCH A/N REs 12 on sPUSCH 27 are dimensioned ignoring the A/N transmission that have occurred on PUSCH 21. Since sTTI4 15 collides with PUSCH DMRS 23, the PDSCH A/N payload (or number of REs 12 needed) on sPUSCH 27, referred to as "X4", may be larger than that of "X5" for the same channel and transmission parameters.

In another example, if sTTI transmission occurs at least in sTTI0 15, only a part of the PDSCH A/N payload is transmitted on sPUSCH 27 in sTTI0 if PUSCH 21 is supposed to be resumed after sTTI0 15, since the rest of the PDSCH A/N payload may be transmitted in their original locations in PUSCH 21 (i.e., symbols 4, 9, and 11). If those symbols 10 are dropped due to additional sTTI transmissions, those sTTI transmissions also carry a part of the PDSCH ACK-NACK payload.

Similar rules can be applied for RI 31 instead of PDSCH A/N 33.

In one example, when only one transport block is transmitted in the PUSCH conveying the HARQ-ACK bits, rank indicator bits or CRI bits, the number of coded modulation symbols per layer Q' for HARQ-ACK, rank indicator, or CRI bits on PUSCH is given by Equation 1.

$$Q' = \min\left(\left\lceil \frac{O \cdot M_{SC}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{SC}^{PUSCH}\right) \quad \text{Equation 1}$$

where O is the number of HARQ-ACK bits, rank indicator bits or CRI bits, $M_{sc}^{PUSCH}$ is the scheduled bandwidth for PUSCH transmission in the current sub-frame for the transport block, expressed as a number of subcarriers, $N_{sym}^{PUSCH-initial}$ is the number of SC-FDMA symbols per subframe for initial PUSCH transmission for the same transport block, $M_{sc}^{PUSCH-initial}$, C, and $K_r$ are obtained from the initial PDCCH or EPDCCH for the same transport block, or the most recent semi-persistent scheduling assignment PDCCH or EPDCCH when the initial PUSCH for the same transport block is semi-persistently scheduled, or wherein the random access response grant for the same transport block, when the PUSCH 21 is initiated by the random access response grant.

In one embodiment, C is the number of code blocks of the transport block (after segmentation) and $K_r$ is the number of bits for code block number r. $\beta_{offset}^{PUSCH}$, $\beta_{offset}^{sPUSCH}$ may be an offset value (>=1) for PUSCH, and may be different for HARQ-A/N 33 and RI 31, and CRI and may be dependent on the number of PUSCH layers or number of codewords on PUSCH 21.

In one embodiment, only a fraction (α) of the coded modulation symbols 10 per layer Q' is transmitted on PUSCH 21 before the collision with sTTI, the number of coded modulation symbols per layer Q" on sPUSCH/sTTI can be determined using Equation 2.

$$Q'' = \frac{(1-\alpha)Q' \cdot m_1^{PUSCH} \cdot \beta_{offset}^{PUSCH}}{m_2^{sPUSCH} \cdot \beta_{offset}^{sPUSCH}} \quad \text{Equation 2}$$

Wherein in Equation 2, $$m_1^{PUSCH} = \frac{\sum_{r=0}^{C-1} K_r}{M_{SC}^{PUSCH-initial} \cdot N_{symb}^{PUSCH-initial}}$$

is a representation of the modulation and coding rate for the PUSCH TB, and $$m_1^{sPUSCH} = \frac{\sum_{r=0}^{C'-1} K'_r}{M_{SC}^{sPUSCH-initial} \cdot N_{symb}^{sPUSCH-initial}}$$

is a representation of the modulation and coding rate for the sPUSCH TB, $N_{symb}^{sPUSCH-initial}$ is the number of SC-FDMA symbols for sTTI for initial sPUSCH transmission for the same transport block, $M_{SC}^{sPUSCH-initial}$, C', and $K_r'$ are obtained from the initial PDCCH or EPDCCH for the same transport block on sPUSCH 27, or the most recent semi-persistent scheduling assignment PDCCH or EPDCCH when the initial sPUSCH for the same transport block is semi-persistently scheduled, or, the random access response grant for the same transport block, when the sPUSCH 27 is initiated by the random access response grant. In addition, C' may be the number of code blocks of the transport block (after segmentation) for sPUSCH, $K_r'$ may be the number of bits for code block number r, $\delta_{offset}^{sPUSCH}$ is an offset value (>=1) for sPUSCH, and may be different for HARQ-ACK, RI, CRI and may be dependent on the number of sPUSCH layers or number of codewords on sPUSCH. The number of coded modulation symbols per layer Q" on sPUSCH/sTTI may be upper bounded by a particular value.

In one embodiment, the number of coded modulation symbols per layer Q" on sPUSCH 27 may be based on the number of SC-FDMA symbols in the sTTI. In a certain embodiment, when one PUSCH SC-FDMA symbol 10 containing A/N 33 (out of the 4) is dropped (sTTI 5 transmission), $\alpha=1/4$.

A similar procedure for determining the number of coded modulation symbols per layer Q" on sPUSCH 27/sTTI 15 can be applied when multiple transport blocks are transmitted on PUSCH 21 and/or sPUSCH 27. For example, the case when two transport blocks (denoted (1) and (2) in superscript in the equations below) are transmitted in the PUSCH conveying the HARQ-ACK bits, rank indicator bits or CRI bits as in Equation 3:

$$Q' \max[\min(Q'_{temp}, 4 \cdot M_{SC}^{PUSCH}), Q'_{min}] \quad \text{Equation 3}$$

$$Q'_{temp} = \begin{bmatrix} O \cdot M_{SC}^{PUSCH-initial(1)} \cdot N_{symb}^{PUSCH-initial(1)} \cdot \\ M_{SC}^{PUSCH-initial(2)} \cdot N_{symb}^{PUSCH-initial(2)} \cdot \beta_{offset}^{PUSCH} \\ \hline \sum_{r=0}^{C^{(1)}} K_r^{(1)} \cdot M_{SC}^{PUSCH-initial(2)} \cdot N_{symb}^{PUSCH-initial(2)} + \\ \sum_{r=0}^{C^{(2)}} K_r^{(2)} \cdot M_{SC}^{PUSCH-initial(1)} \cdot N_{symb}^{PUSCH-initial(1)} \end{bmatrix} \quad \text{Equation 4}$$

$$m_1^{PUSCH} = \frac{\sum_{r=0}^{C^{(1)}} K_r^{(1)} + \sum_{r=0}^{C^{(2)}} K_r^{(2)}}{M_{SC}^{PUSCH-initial(1)} \cdot N_{symb}^{PUSCH-initial(1)} + M_{SC}^{PUSCH-initial(2)} \cdot N_{symb}^{PUSCH-initial(2)}} \quad \text{Equation 5}$$

Equation 4 is a representation of the modulation and coding rate for the two PUSCH TBs. Equation 5 is a representation of the modulation and coding rate for two sPUSCH TBs.

$$m_1^{sPUSCH} = \frac{\sum_{r=0}^{C^{(1)}} K_r'^{(1)} + \sum_{r=0}^{C^{(2)}} K_r'^{(2)}}{M_{SC}^{sPUSCH-initial(1)} \cdot N_{symb}^{sPUSCH-initial(1)} + M_{SC}^{sPUSCH-initial(2)} \cdot N_{symb}^{sPUSCH-initial(2)}} \quad \text{Equation 6}$$

Equation 6 is a representation of the modulation and coding rate for the two sPUSCH TBs.

Power Control Aspects

In one embodiment, the $f_c$ parameter used in power control for sPUSCH 27 and PUSCH 21 is calculated as follows:

If accumulation not activated for PUSCH 21 in subframe "n" 13, $f_c$ is determined based on the UL grant (referred to here as UL_grant1) scheduling the PUSCH 21 (the grant can be sent in subframe "n−4" or "n−3" depending on whether reduced processing time is enabled for 1 ms-TTI PUSCH transmission).

Alternatively, $f_c$ for PUSCH transmission in subframe "n" 13 can be determined based on the UL grant (referred to here as UL_grant2) scheduling the latest sPUSCH 27 prior to subframe "n." For example, if a sPUSCH transmission happens at subframe "n−1," 13 $f_c$ for PUSCH transmission in subframe "n" 13 can be determined according to the UL grant scheduling sPUSCH transmission in subframe "n−1".

The UL grant (i.e., UL_grant2) for the sPUSCH in subframe "n−1" 13, might have been sent in subframe "n−2" 13.

Alternatively, $f_c$ for PUSCH transmission in subframe "n" can be determined based on both the UL_grant1 and UL_grant2. For instance, $f_c$ can be determined based on the weighted average of $f_c$ obtained from each grant: $f_c = \alpha_1 f_c^{PUSCH} + \alpha_2 f_c^{sPUSCH}$, where $f_c^{PUSCH}$, and $f_c^{sPUSCH}$ are the $f_c$ derived based on UL_grant1, and UL_grant2, respectively, and $\alpha_1 + \alpha_2 = 1$, and the weights $(\alpha_1, \alpha_2)$ are both positive. In a more general setting, $f_c = G(f_c^{PUSCH}, f_c^{sPUSCH})$, where $G(a,b)$ is a function of "a" and "b". The weights or the function $G(.,.)$ can be a function of the resource allocation for sPUSCH and PUSCH.

For sPUSCH in subframe "n", $f_c$ is determined based on the UL grant scheduling the sPUSCH transmission.

Alternatively, $f_c$ can be determined based on a physical layer signal that is valid for the subframe, which result in the same $f_c$ applied to all sTTIs 15 and PUSCH 21 in the subframe 13. A $f_c$ that is a scaled version based on resource allocation of the sPUSCH 27 and the resource allocation indicated in the physical layer signal wherein the basic $f_c$ for PUSCH 21 is calculated.

If accumulation is activated for, a PUSCH 21 in subframe "i", $f_c(i) = f_c(i-1) + \delta_{PUSCH,c}(i-K_{PUSCH})$, where $\delta_{PUSCH,c}(i-K_{PUSCH})$ is the UL grant scheduling the PUSCH 21 (the grant can be sent in subframe "n−4" or "n−3" depending on whether reduced processing time is enabled for 1 ms-TTI PUSCH transmission), and where $f_c(i-1)$ refers to the latest $f_c$ that is calculated for prior PUSCH transmissions.

Alternatively, $f_c(i-1)$ is derived based on the latest $f_c$ that is calculated for the latest prior PUSCH or sPUSCH transmissions, where the prior PUSCH or sPUSCH transmissions corresponding UL grant happened before the UL grant scheduling the PUSCH transmission in subframe "i".

Figure 2C:
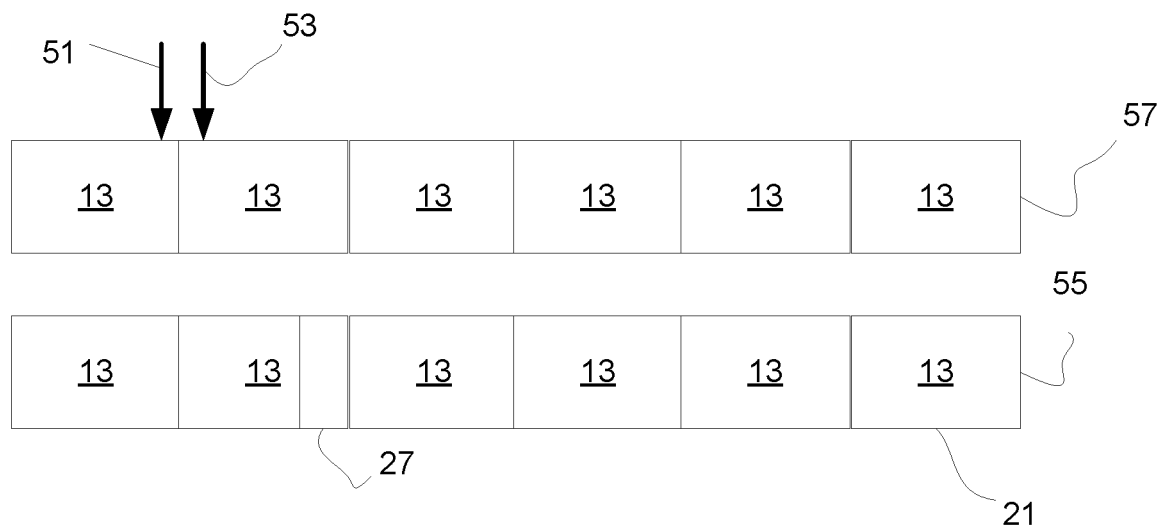
FIG. 2C is a schematic diagram illustrating a shortened PUSCH grant being the latest grant before a PUSCH grant.

In FIG. 2C illustrates one embodiment wherein an sPUSCH grant was the latest grant before the PUSCH grant. Transmissions of a PUSCH 21 and a sPUSCH 27 in UL 55 are shown along with an sPUSCH grant 51 and a PUSCH grant 53 in the DL 57. To update fc for PUSCH power allocation when accumulation is activated, fc(i−1) is selected based on fc computed for the latest sPUSCH transmission wherein the corresponding sPUSCH grant 51 is the latest one before the PUSCH grant 53. If the latest UL grant before the PUSCH UL grant 53 was another PUSCH UL grant 53, that other PUSCH UL grant 53 should be used for fc(i−1) calculation.

In one embodiment, sPUSCH 27 is scheduled for transmission in sTTI0 of subframe "i", if PUSCH transmission starts after the sTTI0 (for example from sTTI1), the fc(i) for the PUSCH 21 can be obtained based on the latest UL grant before the PUSCH grant 53, or alternatively, based on the latest UL grant before PUSCH transmission, or alternatively can be obtained based on $f_c(i) = f_c(i-1)$ where the PUSCH grant 53 (i.e., the term $\delta_{PUSCH,c}(i-K_{PUSCH})$) is ignored.

Alternatively, $f_c(i) = Y(f_c(i-1))$, where $Y(.)$ is a function, e.g., can be $Y(w) = a \times w$, where "a" is a coefficient determined by the UE 110 based on higher layer signaling, physical layer signaling, or based on the resource allocation, or based on the combinations of one or above mentioned parameters.

If accumulation is activated for sPUSCH 27 in sTTI "m" 15 ($0 \leq m \leq 5$) in subframe "i," if there was another sTTI transmission in the subframe in sTTI "m−1" 15, the fc for sPUSCH transmission can be obtained $f_c^s(6i+m) = f_c(6i+m-1) + \delta_{sPUSCH,c}(6i+m-K_{sPUSCH})$ wherein $f_c(6i+m-1)$ is obtained based on the prior sPUSCH transmission.

If there was another sTTI transmission in the subframe 13, before sTTI "m" 15, the fc for sPUSCH transmission (shown as $f_c^{sPUSCH}(6i+m))$ may be obtained $f_c^{sPUSCH}(6i+m)=f_c(6i+m-1)+\delta_{sPUSCH,c}(6i+m-K_{sPUSCH})$, wherein $f_c(6i+m-1)$ is obtained based on the latest sPUSCH transmission. Alternatively, if PUSCH 21 was being transmitted prior to the sPUSCH 27 in subframe "i" 13, $f_c(6i+m-1)$ can be obtained based on the fc used for PUSCH transmission prior to sPUSCH transmission in sTTI "m" 15.

Based on the latest $f_c(6i+m-1)$ of alternative 1 and 2 above, if m=0, we can use the approaches mentioned in in the preceding paragraph. As a result, $f_c(6i+m-1)$ may employ one or two variants:

Variant 1: $f_c(6i+m-1)$ can be obtained based on the fc computed for PUSCH transmission in subframe "i" 13 although it has not been transmitted yet, i.e., $f_c^{sPUSCH}(6i+m)=f_c^{PUSCH}(i)+\delta_{sPUSCH,c}(6i+m-K_{sPUSCH})$.

Variant 2: $f_c(6i+m-1)$ can be obtained based on the fc computed for PUSCH transmission in subframe "i−1" 13 or the latest prior subframe 13, i.e., $f_c^{sPUSCH}(6i+m)=f_c^{PUSCH}(i-1)+\delta_{sPUSCH,c}(6i+m-K_{sPUSCH})$.

Figure 2D:
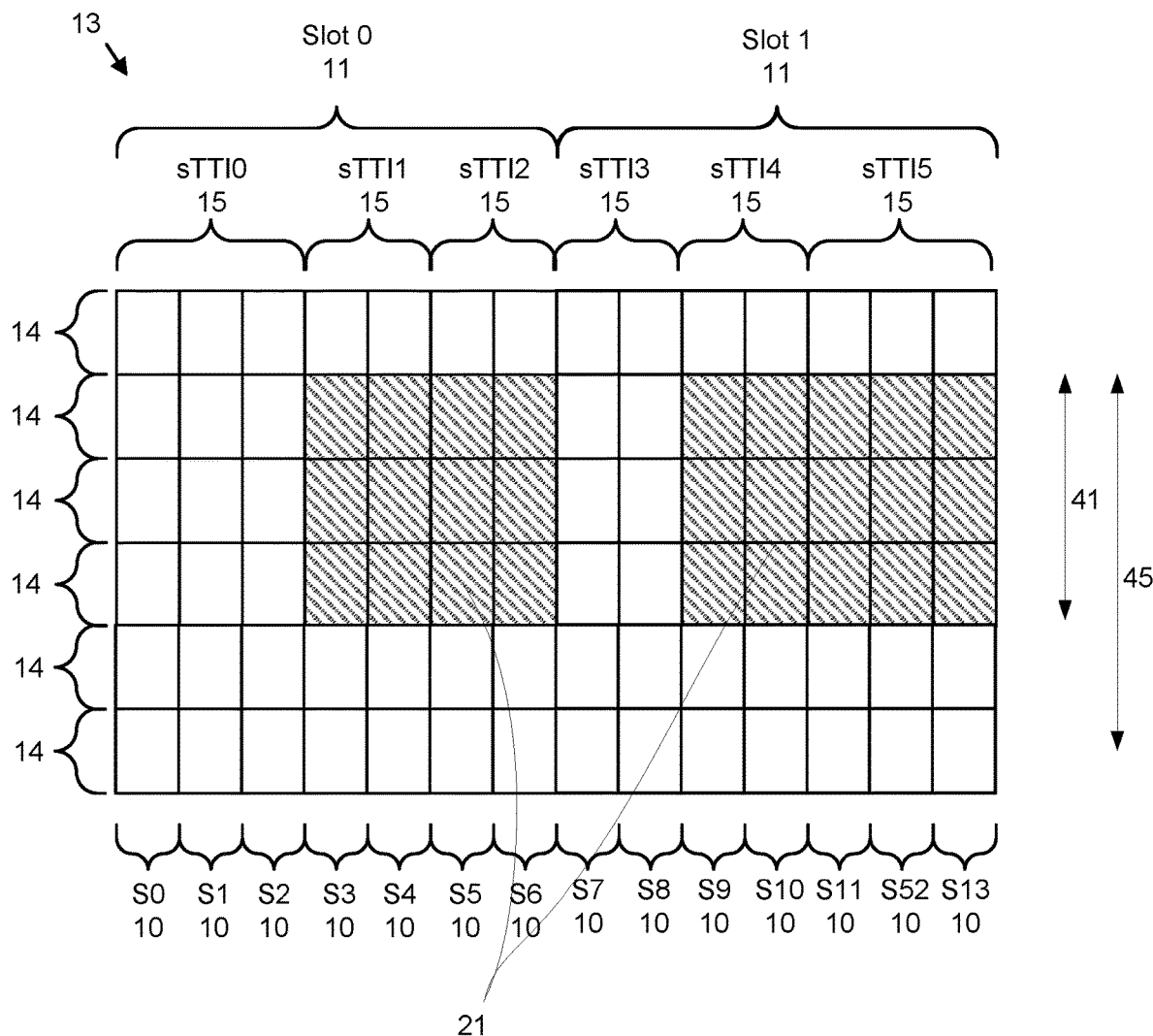
FIG. 2D is a schematic diagram illustrating using same fc parameter for PUSCH transmissions.

If PUSCH 21 stopped and resumed in a subframe 13 due to sTTI transmissions, the PUSCH 21 uses the same fc and transmit power over the subframe 13 (See FIG. 2D). In one example, the same fc that was computed for PUSCH transmission earlier in the subframe 13. In one example, if sPUSCH 27 is transmitted in a latest sTTI 15 before PUSCH 21 (e.g., sTTI0) and no prior PUSCH transmission (e.g., no PUSCH bundling), the PUSCH 21 can use the fc value computed for the latest sTTI 15. The latest sTTI 15 may be latest sTTI 15 in the previous subframe or the latest sTTI 15 since receiving the PUSCH UL grant 53, or the latest sTTI corresponding to the latest sTTI UL grant 51 since receiving the PUSCH UL grant 53.

FIG. 2D illustrates using a same fc parameter for PUSCH transmissions in the subframe 13. In the depicted embodiment, a single fc parameter is used for each PUSCH 21.

Figure 2E:
FIG. 2E is a schematic block data illustrating one embodiment of system data.

FIG. 2E is a schematic block data illustrating one embodiment of system data 200. The system data 200 may be organized as a data structure in a memory. In the depicted embodiment, the system data 200 includes an intra-TTI hopping value 201, a number of resource blocks 203, a target power received 205, a scaled path downlink loss estimate 207, an adjustment factor 209, power control adjustment states 211, cyclic shifts 213, orthogonal cover codes 215, a resumption policy 217, and transmit power 219.

The intra-TTI hopping value 201 may indicate whether intra-TTI hopping is enabled or disabled. The number of resource elements 203 may specify a number of RI 31 QRI and a number of A/N 33 QAN. The target power received $P_{O\_PUSCH,c}(j)$ 205 may be received at the UE 110 over RRC. The scaled path downlink loss estimate $\alpha_c(j)PL_c$ 207, wherein $0 \le \alpha_c(j) \le 1$, may be signaled to the UE 110 over the RRC. The adjustment factor $\Delta_{TF,c}(i)$ 209 may be based on a number of coded bits as defined in LTE 36.213.

The resumption policy 217 may be satisfied for PUSCH collision in response to the PUSCH 21 being for a high ranked transmission and cyclic shifts and orthogonal cover codes (OCC) comprising the DMRS 23. The resumption policy 217 may not be not satisfied for PUSCH collision in response to the PUSCH 21 not being for a high ranked transmission and cyclic shifts and OCC not comprising the DMRS 23.

Figure 3A:
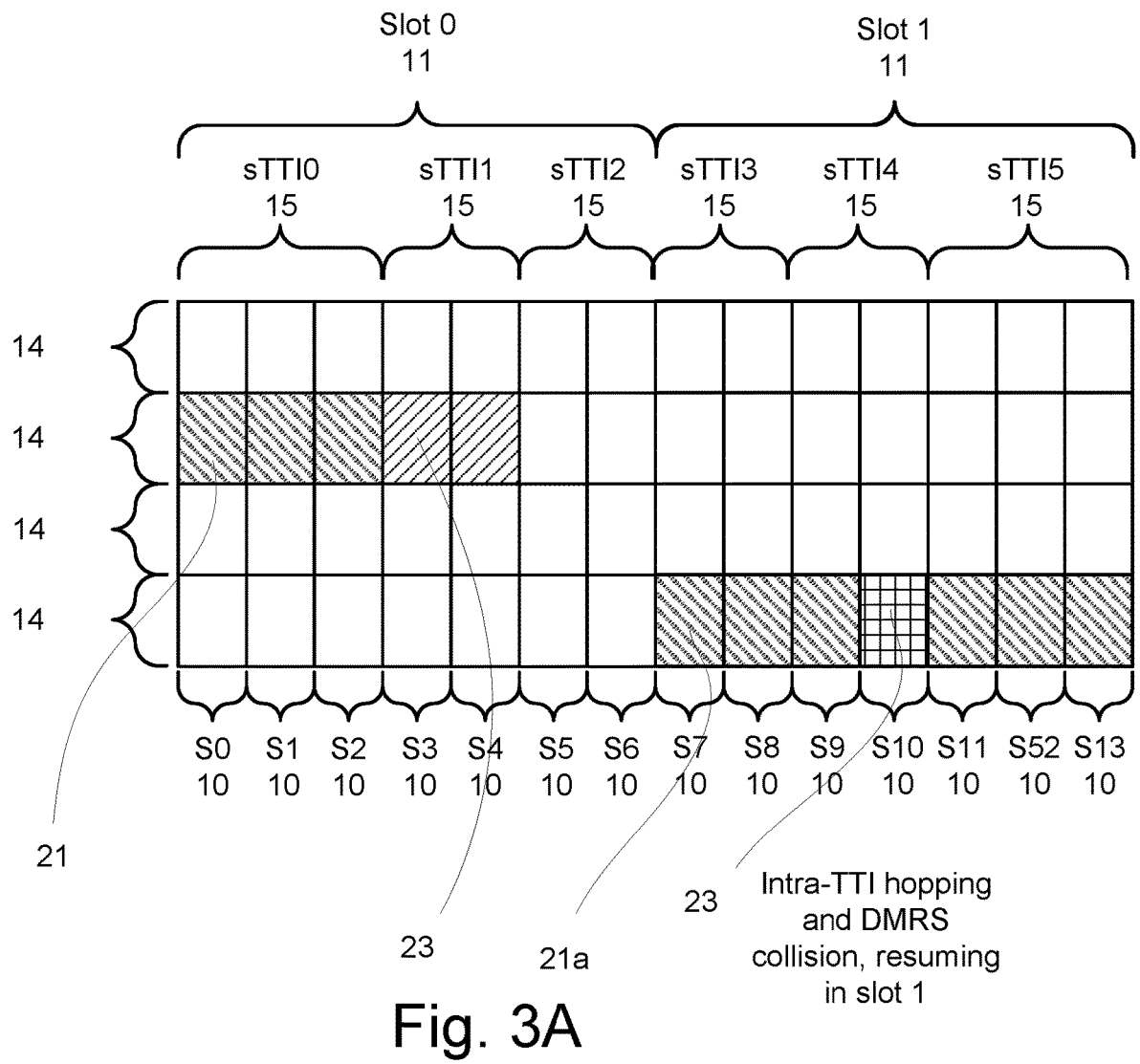
FIG. 3A is a schematic diagram illustrating one embodiment of PUSCH resumption.

FIG. 3A is a schematic diagram illustrating one embodiment of PUSCH resumption. In the depicted embodiment, intra-TTI hopping is enabled and a PUSCH 21 collides with a DMRS 23. The PUSCH 21a may resume at symbol S7 10 of slot 1 11.

Figure 3B:
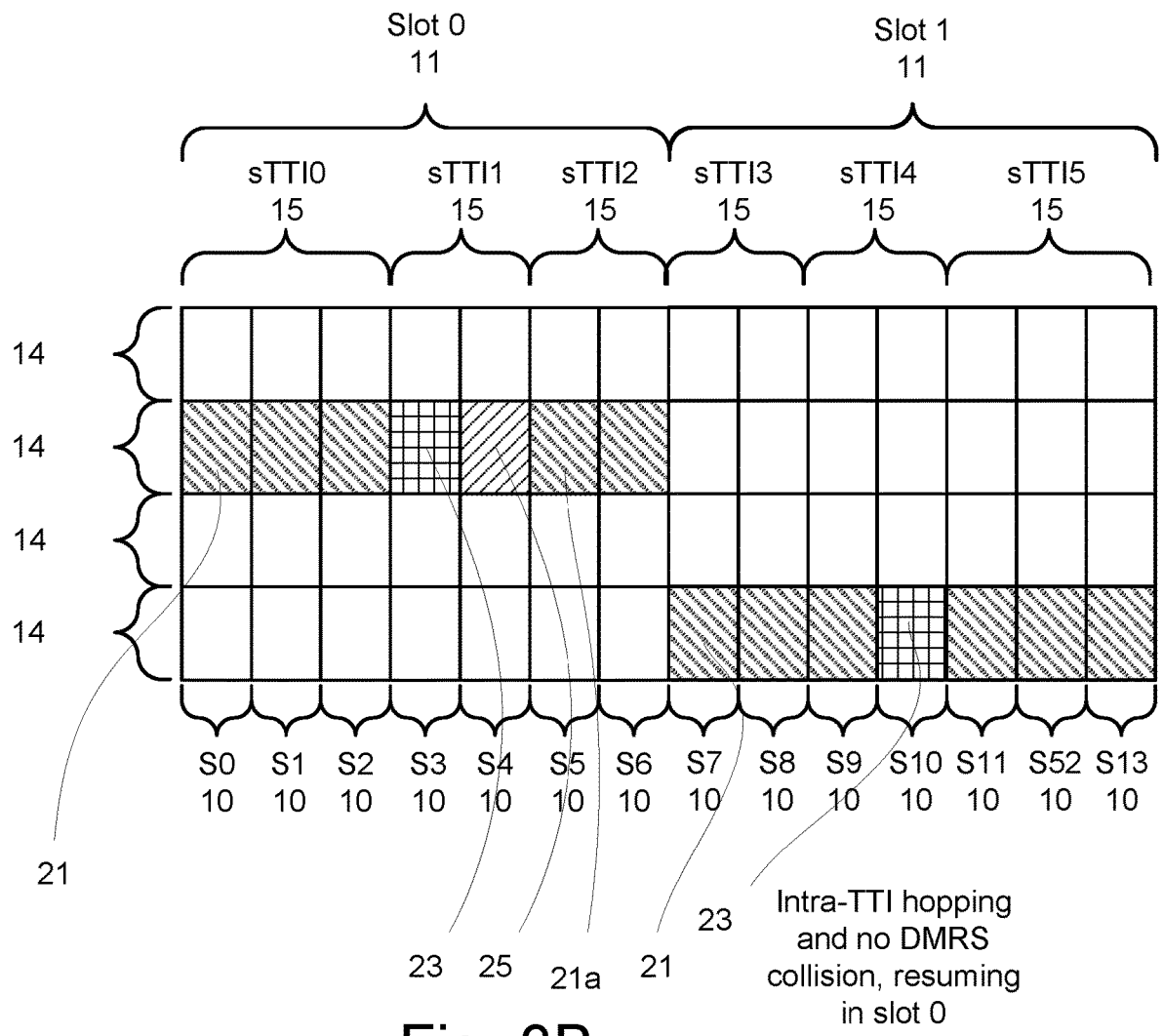
FIG. 3B is a schematic diagram illustrating one alternate embodiment of PUSCH resumption.

FIG. 3B is a schematic diagram illustrating one alternate embodiment of PUSCH resumption. In the depicted embodiment, intra-TTI hopping is enabled and a PUSCH 21 collides with a DMRS 23. The PUSCH 21a may resume at symbol S5 10 of slot 0 11.

Figure 3C:
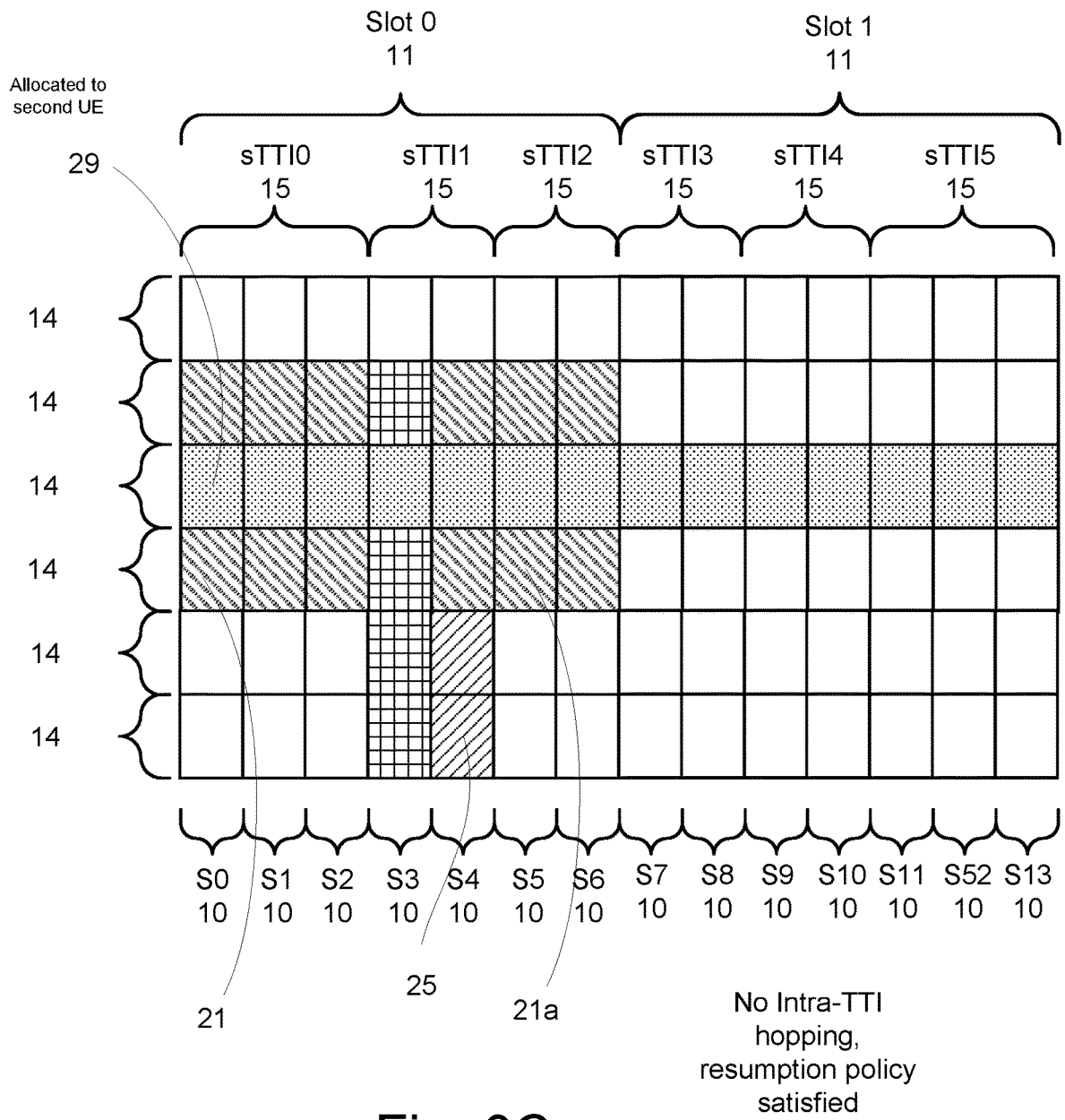
FIG. 3C is a schematic diagram illustrating one alternate embodiment of PUSCH resumption.

FIG. 3C is a schematic diagram illustrating one alternate embodiment of PUSCH resumption. In the depicted embodiment, intra-TTI hopping is disabled and first and second UE 110 are paired for MU-MIMO PUSCH transmission. The first UE 110 may be scheduled to transmit an sPUSCH 27 in symbol S3 10, but cannot. In response to the resumption policy 217 being satisfied, the PUSCH 21a may resume at symbol S5 10 of slot 0 11.

Figure 3D:
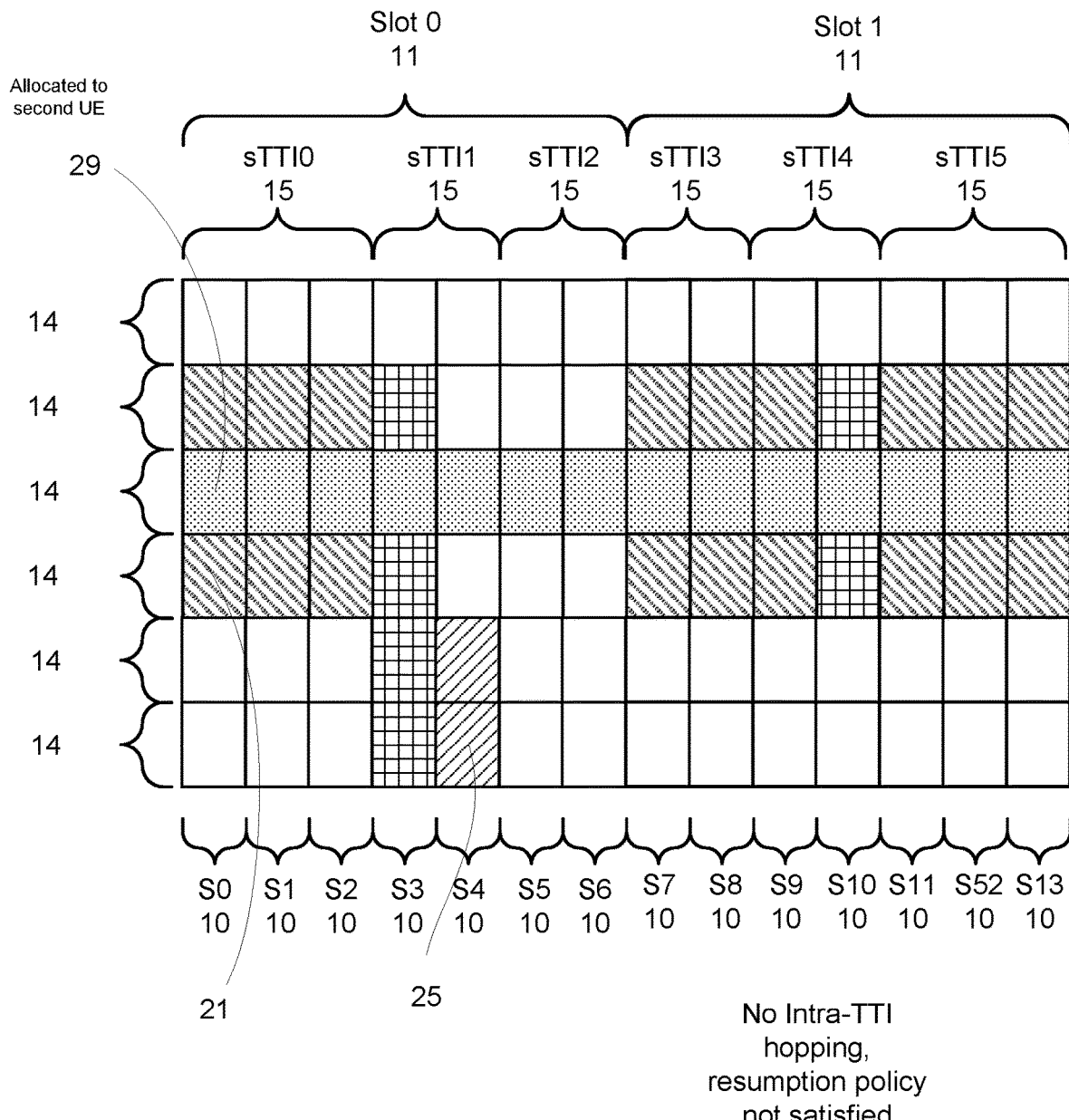
FIG. 3D is a schematic diagram illustrating one alternate embodiment of PUSCH resumption.
Figure 4:
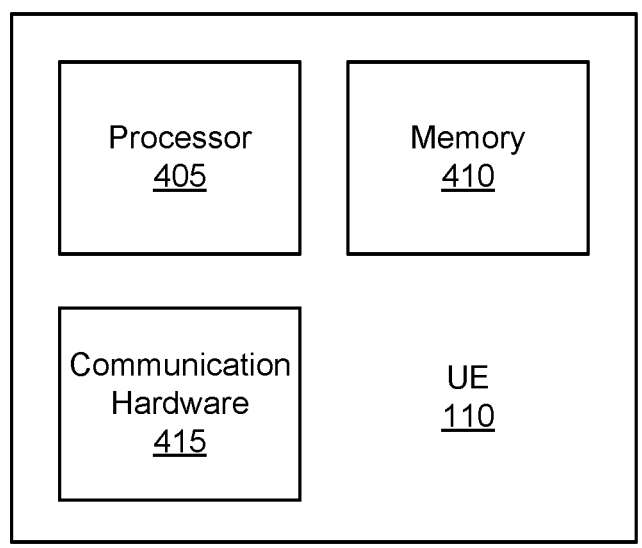

FIG. 3D is a schematic diagram illustrating one alternate embodiment of PUSCH resumption. In the depicted embodiment, intra-TTI hopping is disabled and first and second UE 110 are paired for MU-MIMO PUSCH transmission. The first UE 110 may be scheduled to transmit an sPUSCH 27 in symbol S3 10, but cannot. The PUSCH 21a may resume at symbol S7 10 of slot 1 11.

FIG. 4 is a schematic block diagram illustrating one embodiment of UE 110. In the depicted embodiment, the UE 110 includes a processor 405, a memory 410, and communication hardware 415. The memory 410 may comprise a semiconductor storage device. The memory 410 may store code. The processor 405 may execute the code. The communication hardware 415 may comprise a transceiver and may communicate with the eNB 105.

Figure 5A:
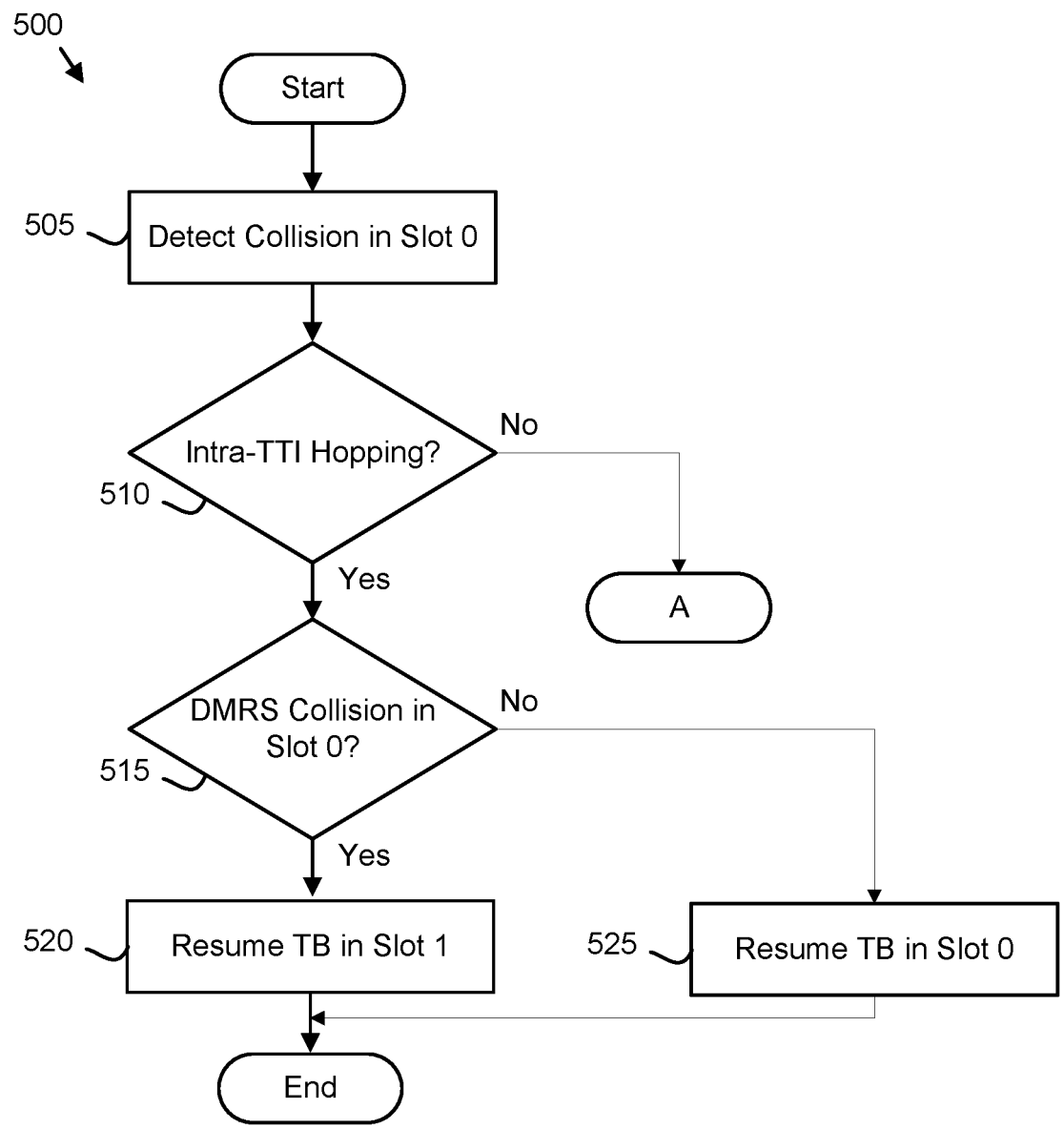
FIGS. 5A-B are a schematic flow chart diagram illustrating one embodiment of a TTI resumption method.
Figure 5B:
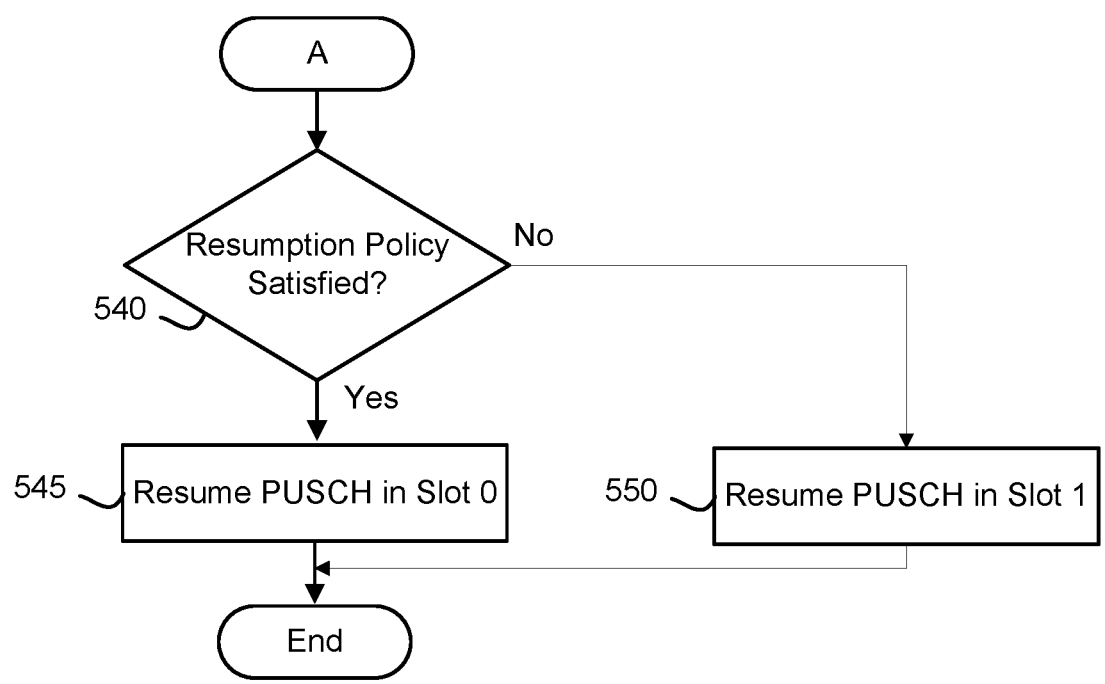

FIGS. 5A-B are a schematic flow chart diagram illustrating one embodiment of a TTI resumption method 500. The method 500 may resume a TTI 16 such as a PUSCH 21 after a collision. The method 500 may be performed by the processor 405.

The method 500 starts, and in one embodiment, the processor 405 detects 505 a collision in slot 0 11. The collision may be between collision between UE uplink transmission resources in a first TTI 16 of a first TTI length and uplink transmission resources in a second TTI 16 of a second TTI length. In a certain embodiment, the collision is between a PUSCH 21 and any sTTI 15 such as an sPUSCH 27.

The processor 405 may determine 510 if intra-TTI hopping is enabled. In one embodiment, the processor 405 consults the intra-TTI hopping value 201.

If intra-TTI hopping is enabled, the processor 405 may determine 515 if the first TTI 16 collided with the sTTI 15 in slot 0 11. If the first TTI 16 collided with the sTTI 15, the processor 405 may resume 520 the TB in slot 1 11 such as is shown in FIG. 3A and the method 500 ends. If the PUSCH DMRS 23 does not collide with the sTTI 15, the processor 405 may resume 525 the TB in slot 0 11 such as is shown in FIG. 3B and the method 500 ends.

If intra-TTI hopping is not enabled, in FIG. 5B, the processor 405 determines 540 if the resumption policy 217 is satisfied. If the resumption policy 217 is satisfied, the first TTI transmission is resumed 545 in slot 0 11 as shown in FIG. 3C. If the resumption policy 217 is not satisfied, the first TTI transmission is resumed 550 in slot 1 11 as shown in FIG. 3D.

Figure 5C:
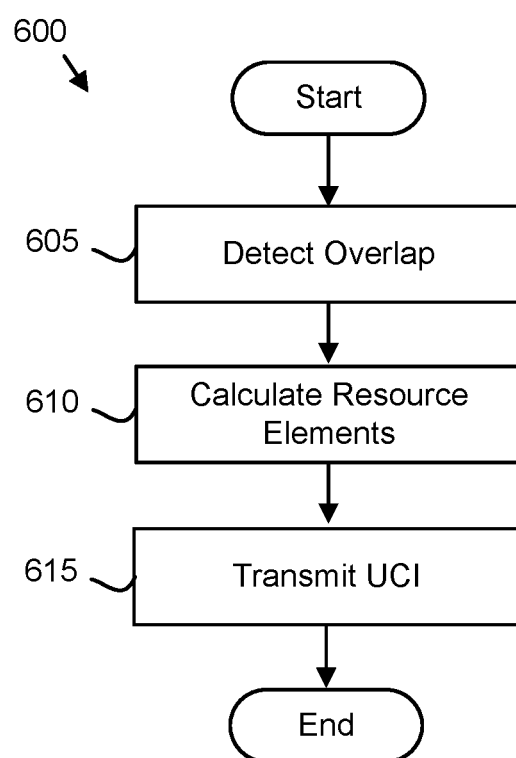
FIG. 5C is a schematic flow chart diagram illustrating one embodiment of a TTI overlap method.

FIG. 5C is a schematic flow chart diagram illustrating one embodiment of a TTI overlap method 600. The method 600 may resume a TTI transmission when portions of TTI 16 such as a PUSCH 21 and an sPUSCH 27 overlap. The method 600 may be performed by the processor 405.

The method 600 starts, and in one embodiment, the processor 405 detects 605 an overlap of portions of TTI such as a PUSCH 21 and an sPUSCH 27, such as is illustrated in FIG. 1E. As a result, some PUSCH UCI are not transmitted as part of the PUSCH 21. The processor 405 may transmit UCI from the PUSCH 21 in the sPUSCH 27.

The processor 405 may calculate 610 the resource elements 12 for transmitting the UCI from the PUSCH 21 in the sPUSCH 27. The number of resource elements 203 for transmitting uplink control information (UCI) in the sPUSCH may be based on one or more of a number of previously transmitted UCI bearing single-carrier frequency division multiple access (SC-FDMA) symbols, an sTTI index with the subframe, and whether the PUSCH transmission is resumed after sTTI transmission within the subframe.

In one embodiment, the number of resource elements 12 for transmitting rank indicators RI 31 is calculated using Equation 7, wherein O is a number of RI 31, $M_{SC}^{PI}$ is specified by an initial PUSCH, $N_{SC}^{PI}$ is a number of single carrier frequency-division multiple access symbols 10, $\beta_{SC}^{P}$ is an offset for the RI 31, and $M_{SC}^{P}$ is a number of subcarriers 14 scheduled for the PUSCH, and wherein the number of resource elements 12 for transmitting acknowledge/non-acknowledge AN 33 is calculated using Equation 8, wherein O is a number of AN 33, $M_{SC}^{PI}$ is specified by an initial PUSCH, $N_{SC}^{PI}$ is a number of single carrier frequency-division multiple access symbols 10, $\beta_{SC}^{P}$ is an offset for the AN 33, and $M_{SC}^{P}$ is a number of subcarriers 14 scheduled for the PUSCH 21.

$$QRI = \left( \left\lceil \frac{[OM_{SC}^{PI} N_{SC}^{PI} \beta_{SC}^{P}]}{\sum_{r=0}^{C-1} K_r} \right\rceil 4M_{SC}^{P} \right) \quad \text{Equation 7}$$

$$QAN = \left( \left\lceil \frac{[OM_{SC}^{PI} N_{SC}^{PI} \beta_{SC}^{P}]}{\sum_{r=0}^{C-1} K_r} \right\rceil 4M_{SC}^{P} \right) \quad \text{Equation 8}$$

Figure 5D:
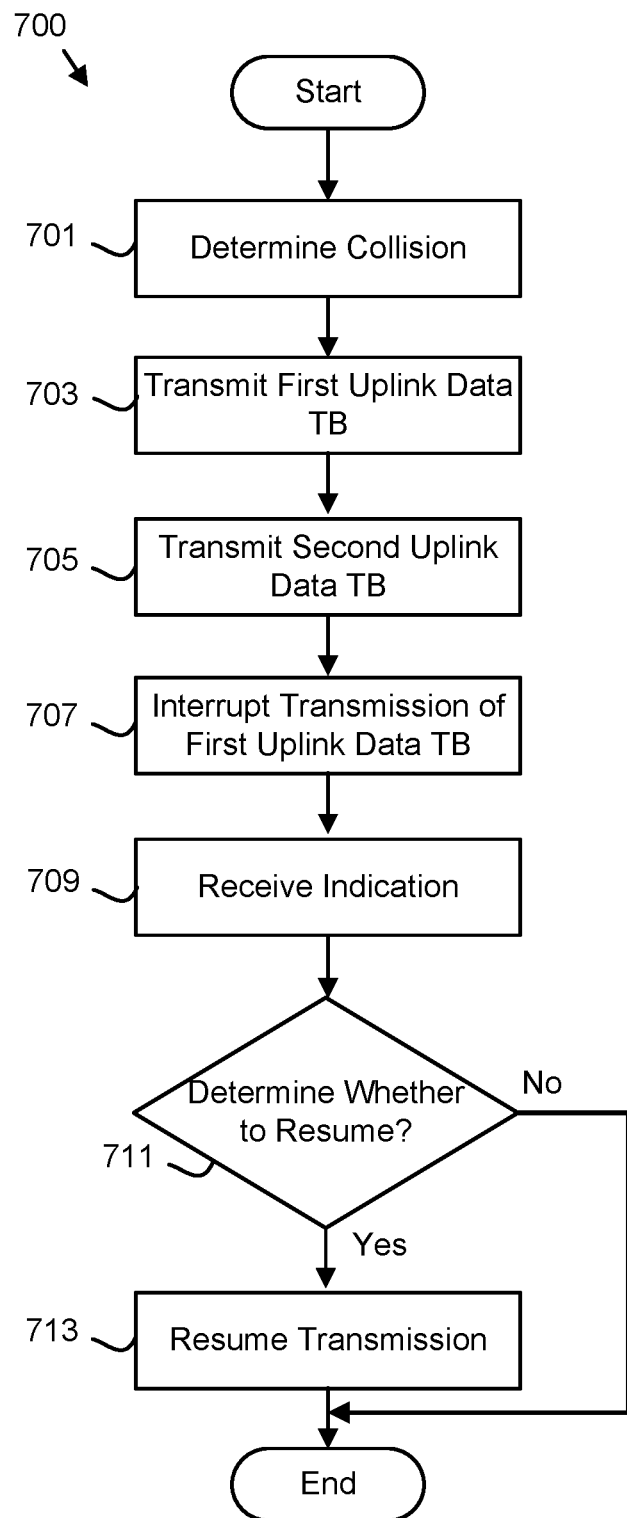
FIG. 5D is a schematic flow chart diagram illustrating one embodiment of a resumption method.

FIG. 5D is a schematic flow chart diagram illustrating one embodiment of a resumption method 700. The method 700 may resume transmission of a first uplink data TB. The method 700 may be performed by a processor 405.

The method 700 starts, and in one embodiment, the processor 405 may determine 701 a collision between UE uplink transmission resources in a first TTI 16 of a first TTI length and uplink transmission resources in a second TTI 16 of a second TTI length. The processor 405 may transmit 703 a first uplink data TB in the first TTI 16. The processor 405 may further transmit 705 a second uplink data TB in the second TTI 16.

The processor 405 may interrupt 707 the transmission of the first uplink data TB before transmission of the second uplink data TB. The processor 405 may receive 709 an indication indicating whether to resume transmission of the first uplink data TB after the transmission of the second uplink TB. In one embodiment, the indication is received via higher layer than physical layer signaling such as RRC.

The processor 405 may determine 711 to resume or not to resume the transmission of the first uplink TB based on the indication. In one embodiment, the processor determines 711 to resume 713 transmission of the first uplink data TB if the UE 110 has determined to resume the transmission of the first uplink TB, wherein the first TTI length is larger than the second TTI length, the first and the second TTI overlap at least in one symbol, the first TTI starts earlier than the second TTI. If the processor 405 determines 711 not resume 713 transmission, the method 700 ends.

Figure 5E:
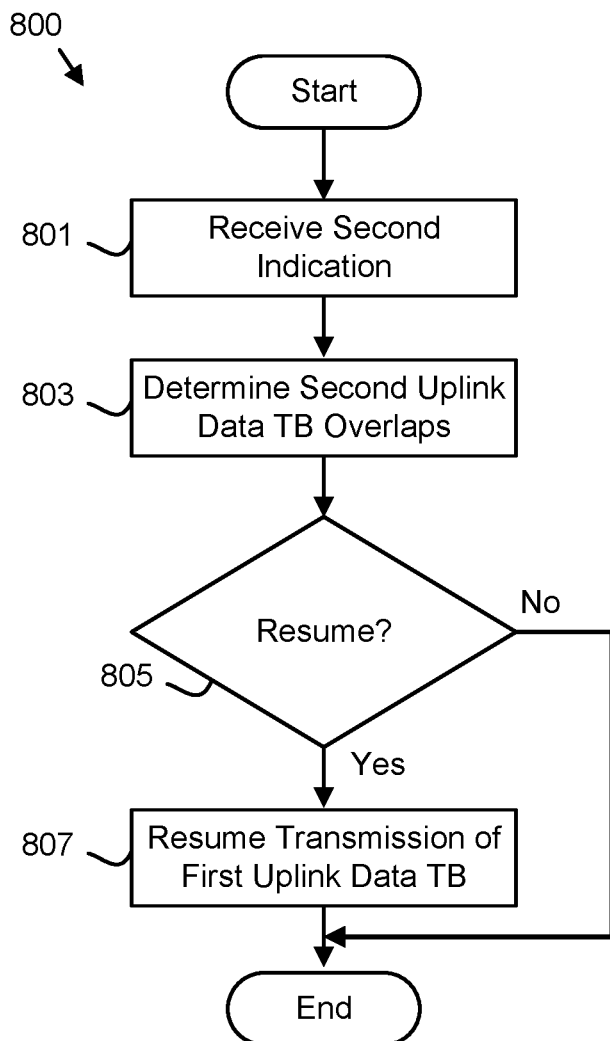
FIG. 5E is a schematic flow chart diagram illustrating one alternate embodiment of a resumption method.

FIG. 5E is a schematic flow chart diagram illustrating one alternate embodiment of a resumption method 800. The method 800 may resume transmission of a first uplink data TB. The method 800 may be performed as part of the method 700 of FIG. 5D. The method 800 may be performed by a processor 405.

The method 800 starts, and in one embodiment, the processor 405 receives 801 a second indication indicating an intra-TTI resource hopping corresponding to uplink data transmissions of the first TTI length.

The processor 405 may determine 803 if the second uplink data TB in the second TTI 16 overlaps in time with DMRS 23 associated with the first uplink data TB in the first TTI 16.

The processor 405 may determine 805 if the intra-TTI resource hopping. The processor 405 may determine 805 if the intra-TTI resource hopping is set based on the indication. If the intra-TTI resource hopping is set based on the indication, an uplink data transmission associated with a TTI 16 of the first TTI length is performed in at least a first set and a second set of resources, wherein at least the second set is determined at least based on the first set. The uplink data transmission may be performed in the first set of resources in a first portion of the TTI 16 and in the second set of resources in a second portion of the TTI 16. The first portion and the second portion may not overlap in time. If the intra-TTI resource hopping is not set based on the indication, an uplink data transmission associated with a TTI 16 of the first TTI length is performed only in the first set of resources over the TTI duration.

In one embodiment, the processor determines 803 whether to resume 805 or not to resume the transmission of the first uplink TB based on the first indication and one or more of the second indication, a transmission rank associated with the first uplink data TB and determination of overlap between the DMRS 23 associated with the first uplink data TB and the second uplink data TB, wherein the transmission rank associated with the first uplink data TB is a number of transmission layers or a number of data streams associated with the first uplink data transmission in the first TTI.

The processor 405 may determine 805 not to resume the transmission of the first uplink TB in the first TTI block if the DMRS 23 of the first uplink data TB in a slot 1 11 of the first TTI 16 overlapped with the second uplink TB and the second TTI 16 is a subset of slot 0 11 of the first TTI 16.

If the processor 405 determines 803 not to resume the first uplink TB transmission, the method 800 ends. If the processor 405 determines 803 to resume the first uplink TB transmission, the processor 405 may resume transmission in one or slot 0 11 and slot 1 11. Transmission may be resumed 807 in slot 1 11 if the DMRS 23 of the first uplink data TB in a first slot of the first TTI 23 overlapped with the second uplink TB. In one embodiment, the first TTI 16 is the union of slot 0 11 and slot 1 11. The second TTI 16 may be a subset of slot 0 11 of the first TTI 16. The slot 0 11 and slot 1 11 of the first TTI 16 may not overlap.

In one embodiment, for transmission ranks lower than a threshold, the transmission of the first uplink TB is not resumed. The first uplink data TB may contain feedback information. The feedback information may include at least one of A/N 33 in response to downlink transmissions or transmission RI 31. A portion of the feedback information may be included in the second uplink data TB.

In one embodiment, the number of resources required for transmission of the feedback information in the second TTI is determined based on at least one of: the number of transmitted feedback information in the first TTI 16 before interrupting the transmission of the first uplink data TB; the location of the second TTI 16 within the first TTI 16; and the determination of whether to resume or not to resume the transmission of the first uplink TB.

In one embodiment, the first uplink data TB is transmitted with a transmission power determined at least based on a transmission power control command (TPC) or a power control adjustment state associated with the transmission power of a third uplink transmission in a TTI 16 of the second TTI length. The TPC command may indicate an adjustment to transmission power of the third uplink transmission in a TTI 16 of the second TTI length.

The power control adjustment state indicates and/or includes a history of transmission power adjustments corresponding to transmissions prior to the transmission of the third uplink transmission. The power control adjustment state indicates and/or includes a history of transmission power adjustments corresponding to transmissions prior to the transmission of the third uplink transmission. The third uplink transmission may be performed before the transmission of the first uplink transmission data block. Transmission power corresponding to the second uplink transmission data block may be determined at least based on the transmission power corresponding to an uplink transmission in a TTI 16 of the second TTI length.

INDUSTRIAL APPLICABILITY

UE uplink transmission resources in a first TTI 16 of a first TTI length may collide with an uplink transmission resources in a second TTI 16 of a second TTI length. The embodiments determine whether to resume transmission of the first TTI 16, and if transmission of the first TTI 16 is resumed, latency is reduced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a device, comprising
determining, by use of a processor, a collision between user equipment (UE) uplink
transmission resources in a first TTI of a first TTI length and uplink transmission resources in a second TTI of a second TTI length;
transmitting a first uplink data transmission block (TB) in the first TTI;
transmitting a second uplink data TB in the second TTI;
interrupting the transmission of the first uplink data TB before transmission of the second uplink data TB;
receiving an indication indicating whether to resume transmission of the first uplink data TB after the transmission of the second uplink TB;
determining to resume or not to resume the transmission of the first uplink TB based on the indication; and
resuming the transmission of the first uplink TB in the first TTI block after the transmission of the second uplink TB if the UE has determined to resume the transmission of the first uplink TB, wherein the first TTI length is larger than the second TTI length, the first and the second TTI overlap at least in one symbol, the first TTI starts earlier than the second TTI;
receiving a second indication, indicating an intra-TTI resource hopping corresponding to uplink data transmissions of the first TTI length, wherein if the intra-TTI resource hopping is set based on the indication, an uplink data transmission associated with a TTI of the first TTI length is performed in at least a first set and a second set of resources, wherein at least the second set is determined at least based on the first set, and wherein the uplink data transmission is performed in the first set of resources in a first portion of the TTI and in the second set of resources in a second portion of the TTI; and wherein the first portion and the second portion do not overlap in time, and if the intra-TTI resource hopping is not set based on the indication, an uplink data transmission associated with a TTI of the first TTI length is performed in the first set of resources over the TTI duration.

2. The method of claim 1, wherein the indication is received via higher layer than physical layer signaling.

3. The method of claim 1, further comprising:
receiving the second indication, indicating that the intra-TTI resource hopping is set;
determining if the second uplink data TB in the second TTI overlaps in time with demodulation reference signals (DMRS) associated with the first uplink data TB in the first TTI; and
determining to resume or not to resume the transmission of the first uplink TB based on the first indication and one or more of the second indication, a transmission rank associated with the first uplink data TB and determination of overlap between the DMRS associated with the first uplink data TB and the second uplink data TB, wherein the transmission rank associated with the first uplink data TB is a number of transmission layers or a number of data streams associated with the first uplink data transmission in the first TTI.

4. The method of claim 3, wherein resuming the transmission of the first uplink TB in the first TTI block further comprises resuming the transmission of the first uplink TB in a second slot of the first TTI block if:
the DMRS of the first uplink data TB in a first slot of the first TTI overlapped with the second uplink TB; and
the second TTI is a subset of the first slot of the first TTI, wherein the first slot and the second slot of the first TTI do not overlap.

5. The method of claim 4, wherein the first TTI is the union of the first and the second slots.

6. The method of claim 3, wherein the transmission of the first uplink TB in the first TTI block is not resumed if:
the DMRS of the first uplink data TB in a second slot of the first TTI overlapped with the second uplink TB; and
the second TTI is a subset of the first slot of the first TTI, wherein the first slot and the second slot of the first TTI do not overlap.

7. The method of claim 3, wherein for transmission ranks lower than a threshold, the transmission of the first uplink TB is not resumed.

8. The method of claim 1, wherein the first uplink data TB contains feedback information.

9. The method of claim 8, wherein the feedback information includes at least one of acknowledgment (ACK/NACK) in response to downlink transmissions or transmission rank indicator (RI).

10. The method of claim 9, wherein a portion of the feedback information is included in the second uplink data TB.

11. The method of claim 10, wherein the number of resources required for transmission of the feedback information in the second TTI is determined based on at least one of:
- the number of transmitted feedback information in the first TTI before interrupting the transmission of the first uplink data TB;
- the location of the second TTI within the first TTI; and
- the determination of resume or not to resume the transmission of the first uplink TB.

12. The method of claim 11, wherein the number of transmitted feedback information in the first TTI before interrupting the transmission of the first uplink data TB is the number of symbols in time containing the feedback information.

13. The method of claim 1, wherein the first uplink transmission data block is transmitted with a transmission power determined at least based on a transmission power control command (TPC) or a power control adjustment state associated with the transmission power of a third uplink transmission in a TTI of the second TTI length, wherein:
- the TPC command indicates an adjustment to transmission power of the third uplink transmission in a TTI of the second TTI length;
- the power control adjustment state indicates a history of transmission power adjustments corresponding to transmissions prior to the transmission of the third uplink transmission; and
- The third uplink transmission is performed before the transmission of the first uplink transmission data block.

14. The method of claim 1, wherein transmission power corresponding to the second uplink transmission data block is determined at least based on the transmission power corresponding to an uplink transmission in a TTI of the second TTI length.

15. An apparatus comprising:
a processor performing:
- determining a collision between user equipment (UE) uplink transmission resources in a first TTI of a first TTI length and uplink transmission resources in a second TTI of a second TTI length;
- transmitting a first uplink data transmission block (TB) in the first TTI;
- transmitting a second uplink data TB in the second TTI;
- interrupting the transmission of the first uplink data TB before transmission of the second uplink data TB;
- receiving an indication indicating whether to resume transmission of the first uplink data TB after the transmission of the second uplink TB;
- determining to resume or not to resume the transmission of the first uplink TB based on the indication; and
- resuming the transmission of the first uplink TB in the first TTI block after the transmission of the second uplink TB if the UE has determined to resume the transmission of the first uplink TB, wherein the first TTI length is larger than the second TTI length, the first and the second TTI overlap at least in one symbol, the first TTI starts earlier than the second TTI;
- receiving a second indication, indicating an intra-TTI resource hopping corresponding to uplink data transmissions of the first TTI length, wherein if the intra-TTI resource hopping is set based on the indication, an uplink data transmission associated with a TTI of the first length is performed in at least a first set and a second set of resources, wherein at least the second set is determined at least based on the first set, and wherein the uplink data transmission is performed in the first set of resources in a first portion of the TTI and in the second set of resources in a second portion of the TTI; and wherein the first portion and the second portion do not overlap in time, and if the intra-TTI resource hopping is not set based on the indication, an uplink data transmission associated with a TTI of the first TTI length is performed in the first set of resources over the TTI duration.

16. The apparatus of claim 15, wherein the indication is received via higher layer than physical layer signaling.

17. The apparatus of claim 15, the processor further:
- receiving the second indication, indicating that the intra-TTI resource hopping is set;
- determining if the second uplink data TB in the second TTI overlaps in time with demodulation reference signals (DMRS) associated with the first uplink data TB in the first TTI; and
- determining to resume or not to resume the transmission of the first uplink TB based on the first indication and one or more of the second indication, a transmission rank associated with the first uplink data TB and determination of overlap between the DMRS associated with the first uplink data TB and the second uplink data TB, wherein the transmission rank associated with the first uplink data TB is a number of transmission layers or a number of data streams associated with the first uplink data transmission in the first TTI.

18. The apparatus of claim 17, wherein resuming the transmission of the first uplink TB in the first TTI block further comprises resuming the transmission of the first uplink TB in a second slot of the first TTI block if:
- the DMRS of the first uplink data TB in a first slot of the first TTI overlapped with the second uplink TB; and
- the second TTI is a subset of the first slot of the first TTI, wherein the first slot and the second slot of the first TTI do not overlap.

19. The apparatus of claim 18, wherein the first TTI is the union of the first and the second slots.

20. The apparatus of claim 17, wherein the transmission of the first uplink TB in the first TTI block is not resumed if:
- the DMRS of the first uplink data TB in a second slot of the first TTI overlapped with the second uplink TB; and
- the second TTI is a subset of the first slot of the first TTI, wherein the first slot and the second slot of the first TTI do not overlap.

* * * * *